(12) United States Patent
Chen

(10) Patent No.: US 7,639,759 B2
(45) Date of Patent: Dec. 29, 2009

(54) CARRIER TO NOISE RATIO ESTIMATIONS FROM A RECEIVED SIGNAL

(75) Inventor: Ernest C. Chen, San Pedro, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 589 days.

(21) Appl. No.: 10/913,927

(22) Filed: Aug. 5, 2004

(65) Prior Publication Data

US 2005/0008100 A1    Jan. 13, 2005

Related U.S. Application Data

(63) Continuation-in-part of application No. 09/844,401, filed on Apr. 27, 2001, now Pat. No. 7,209,524.

(51) Int. Cl.
*H03D 3/22* (2006.01)

(52) U.S. Cl. ........................ 375/329; 375/316

(58) Field of Classification Search ................. 375/324, 375/326, 327, 329, 340, 316
See application file for complete search history.

(56) References Cited

U.S. PATENT DOCUMENTS

| | | | |
|---|---|---|---|
| 3,076,180 A | 1/1963 | Havens et al. |
| 3,383,598 A | 5/1968 | Sanders |
| 3,878,468 A | 4/1975 | Falconer et al. |
| 3,879,664 A | 4/1975 | Monsen |
| 3,974,449 A | 8/1976 | Falconer |
| 4,039,961 A | 8/1977 | Ishio et al. |
| 4,068,186 A | 1/1978 | Sato et al. |
| 4,213,095 A | 7/1980 | Falconer |
| 4,253,184 A | 2/1981 | Gitlin et al. |
| 4,283,684 A | 8/1981 | Satoh |
| 4,384,355 A | 5/1983 | Werner |
| RE31,351 E | 8/1983 | Falconer |
| 4,416,015 A | 11/1983 | Gitlin |
| 4,422,175 A | 12/1983 | Bingham et al. |
| 4,484,337 A | 11/1984 | Leclert et al. |
| 4,500,984 A | 2/1985 | Shimbo et al. |
| 4,519,084 A | 5/1985 | Langseth |
| 4,594,725 A | 6/1986 | Desperben et al. |
| 4,628,507 A | 12/1986 | Otani |

(Continued)

FOREIGN PATENT DOCUMENTS

CA    2442400    11/2002

(Continued)

OTHER PUBLICATIONS

Notice of Allowance dated Sep. 6, 2007 for U.S. Appl. No. 10/692,491, filed Oct. 24, 2003, Ernest C. Chen.

(Continued)

*Primary Examiner*—Emmanuel Bayard

(57) ABSTRACT

Techniques for measuring the carrier to noise ratio (CNR) in a received digital signal are disclosed. The methods can operate on a received digital signal, such as a layered modulation signal used in a satellite television system. The CNR measurement can be made at the output of a carrier recovery loop or a timing recovery loop in a demodulator. Alternately, the CNR measurement can be made when the received signal is digitized in an analog to digital (A/D) converter at base-band by the demodulator.

24 Claims, 27 Drawing Sheets

U.S. PATENT DOCUMENTS

| | | | |
|---|---|---|---|
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A | 5/1989 | Borth et al. | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,992,747 A | 2/1991 | Myers | |
| 4,993,047 A | 2/1991 | Moffatt et al. | |
| 5,043,734 A | 8/1991 | Niho | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,206,886 A | 4/1993 | Bingham | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A | 2/1994 | Chennakeshu et al. | |
| 5,317,599 A | 5/1994 | Obata | |
| 5,329,311 A | 7/1994 | Ward et al. | |
| 5,337,014 A | 8/1994 | Najle et al. | |
| 5,353,307 A | 10/1994 | Lester et al. | |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A * | 11/1995 | Koslov | 375/344 |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,592,481 A | 1/1997 | Wiedeman et al. | |
| 5,602,868 A | 2/1997 | Wilson | |
| 5,603,084 A | 2/1997 | Henry et al. | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,644,592 A | 7/1997 | Divsalar et al. | |
| 5,646,935 A | 7/1997 | Ishikawa et al. | |
| 5,648,955 A | 7/1997 | Jensen et al. | |
| 5,671,253 A | 9/1997 | Stewart | |
| 5,732,113 A * | 3/1998 | Schmidl et al. | 375/355 |
| 5,790,555 A | 8/1998 | Narahashi et al. | |
| 5,793,818 A * | 8/1998 | Claydon et al. | 375/326 |
| 5,799,010 A | 8/1998 | Lomp et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,903,546 A | 5/1999 | Ikeda et al. | |
| 5,909,454 A | 6/1999 | Schmidt | |
| 5,937,004 A | 8/1999 | Fasulo et al. | |
| 5,940,025 A | 8/1999 | Koehnke et al. | |
| 5,940,750 A | 8/1999 | Wang | |
| 5,946,625 A | 8/1999 | Hassan et al. | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A | 10/1999 | Hummelgaard et al. | |
| 5,970,429 A | 10/1999 | Martin | |
| 5,978,652 A | 11/1999 | Burr et al. | |
| 5,987,068 A | 11/1999 | Cassia et al. | |
| 5,987,069 A | 11/1999 | Furukawa et al. | |
| 5,995,536 A | 11/1999 | Arkhipkin et al. | |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A | 6/2000 | Rahnema | |
| 6,075,808 A | 6/2000 | Tsujimoto | |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,125,260 A | 9/2000 | Wiedeman et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,172,970 B1 | 1/2001 | Ling et al. | |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 * | 2/2001 | Aman et al. | 375/326 |
| 6,212,360 B1 | 4/2001 | Fleming et al. | |
| 6,219,095 B1 | 4/2001 | Zhang et al. | |
| 6,246,717 B1 | 6/2001 | Chen et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |
| 6,314,441 B1 | 11/2001 | Raghunath | |
| 6,320,464 B1 | 11/2001 | Suzuki et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,335,951 B1 | 1/2002 | Cangiani et al. | |
| 6,366,309 B1 | 4/2002 | Siegle | |
| 6,377,116 B1 | 4/2002 | Mattsson et al. | |
| 6,389,002 B1 | 5/2002 | Schilling | |
| 6,389,648 B1 | 5/2002 | Steinert et al. | |
| 6,404,819 B1 | 6/2002 | Gehlot | |
| 6,411,659 B1 | 6/2002 | Liu et al. | |
| 6,411,797 B1 | 6/2002 | Estinto | |
| 6,426,822 B1 | 7/2002 | Winter et al. | |

| | | |
|---|---|---|
| 6,429,740 B1 | 8/2002 | Nguyen et al. |
| 6,433,835 B1 | 8/2002 | Hartson et al. |
| 6,452,977 B1 | 9/2002 | Goldston et al. |
| 6,477,398 B1 | 11/2002 | Mills |
| 6,501,804 B1 | 12/2002 | Rudolph et al. |
| 6,515,713 B1 | 2/2003 | Nam |
| 6,522,683 B1 | 2/2003 | Smee et al. |
| 6,529,715 B1 | 3/2003 | Kitko et al. |
| 6,535,497 B1 | 3/2003 | Raith |
| 6,535,801 B1 | 3/2003 | Geier et al. |
| 6,539,050 B1 | 3/2003 | Lee et al. |
| 6,556,639 B1 | 4/2003 | Goldston et al. |
| 6,574,235 B1 | 6/2003 | Arslan et al. |
| 6,577,353 B1 | 6/2003 | Welles et al. |
| 6,597,750 B1 | 7/2003 | Knutson et al. |
| 6,657,978 B1 | 12/2003 | Millman |
| 6,661,761 B2 | 12/2003 | Hayami et al. |
| 6,678,336 B1 | 1/2004 | Katoh et al. |
| 6,700,442 B2 | 3/2004 | Ha |
| 6,718,184 B1 | 4/2004 | Aiken et al. |
| 6,721,300 B1 | 4/2004 | Akiba et al. |
| 6,731,622 B1 | 5/2004 | Frank et al. |
| 6,731,698 B1 | 5/2004 | Yoshie |
| 6,731,700 B1 | 5/2004 | Yakhnich et al. |
| 6,741,662 B1 | 5/2004 | Francos et al. |
| 6,745,050 B1 | 6/2004 | Forsythe et al. |
| 6,772,182 B1 | 8/2004 | McDonald et al. |
| 6,775,521 B1 | 8/2004 | Chen |
| 6,795,496 B1 | 9/2004 | Soma et al. |
| 6,803,814 B1 | 10/2004 | Krupezevic et al. |
| 6,809,587 B2 | 10/2004 | Ghannouchi et al. |
| 6,891,897 B1 | 5/2005 | Bevan et al. |
| 6,892,068 B2 | 5/2005 | Karabinis et al. |
| 6,922,436 B1 | 7/2005 | Porat et al. |
| 6,922,439 B2 | 7/2005 | Yamaguchi et al. |
| 6,934,314 B2 | 8/2005 | Harles et al. |
| 6,947,741 B2 | 9/2005 | Beech et al. |
| 6,956,841 B1 | 10/2005 | Stahle et al. |
| 6,956,924 B2 * | 10/2005 | Linsky et al. ............... 375/376 |
| 6,970,496 B1 | 11/2005 | Ben-Bassat et al. |
| 6,980,609 B1 * | 12/2005 | Ahn ......................... 375/343 |
| 6,990,627 B2 | 1/2006 | Uesugi et al. |
| 6,999,510 B2 | 2/2006 | Batruni |
| 7,041,406 B2 | 5/2006 | Schuler et al. |
| 7,054,384 B1 | 5/2006 | Ma et al. |
| 7,073,116 B1 | 7/2006 | Settle et al. |
| 7,079,585 B1 | 7/2006 | Settle et al. |
| 7,154,958 B2 | 12/2006 | Dabak et al. |
| 7,161,931 B1 | 1/2007 | Li et al. |
| 7,173,981 B1 | 2/2007 | Chen et al. |
| 7,184,473 B2 | 2/2007 | Chen et al. |
| 7,209,524 B2 | 4/2007 | Chen |
| 7,230,992 B2 | 6/2007 | Walker et al. |
| 7,239,876 B2 | 7/2007 | Johnson et al. |
| 7,251,291 B1 | 7/2007 | Dubuc et al. |
| 7,263,119 B1 | 8/2007 | Hsu et al. |
| 2001/0012322 A1 | 8/2001 | Nagaoka et al. |
| 2001/0016926 A1 | 8/2001 | Riggle |
| 2001/0024479 A1 | 9/2001 | Samarasooriya |
| 2001/0055295 A1 | 12/2001 | Akiyama et al. |
| 2002/0006795 A1 | 1/2002 | Norin et al. |
| 2002/0009141 A1 | 1/2002 | Yamaguchi et al. |
| 2002/0010001 A1 | 1/2002 | Dahlman et al. |
| 2002/0051435 A1 | 5/2002 | Giallorenzi et al. |
| 2002/0064173 A1 | 5/2002 | Watanabe |
| 2002/0067744 A1 | 6/2002 | Fujii et al. |
| 2002/0071506 A1 | 6/2002 | Lindquist et al. |
| 2002/0082792 A1 | 6/2002 | Bourde et al. |
| 2002/0126780 A1 | 9/2002 | Oshima et al. |
| 2002/0136327 A1 | 9/2002 | El-Gamal et al. |
| 2002/0154705 A1 | 10/2002 | Walton et al. |
| 2002/0158619 A1 | 10/2002 | Chen |
| 2002/0172296 A1 | 11/2002 | Pilcher |
| 2002/0176516 A1 | 11/2002 | Jeske et al. |
| 2002/0186761 A1 | 12/2002 | Corbaton et al. |
| 2003/0002471 A1 | 1/2003 | Crawford et al. |
| 2003/0043941 A1 | 3/2003 | Johnson et al. |
| 2003/0072385 A1 | 4/2003 | Dragonetti |
| 2003/0138037 A1 | 7/2003 | Kaku et al. |
| 2003/0138040 A1 | 7/2003 | Rouphael et al. |
| 2003/0147472 A1 | 8/2003 | Bach et al. |
| 2003/0171102 A1 | 9/2003 | Yang |
| 2003/0185310 A1 | 10/2003 | Ketchum et al. |
| 2003/0194022 A1 | 10/2003 | Hammons et al. |
| 2004/0013084 A1 | 1/2004 | Thomas et al. |
| 2004/0091059 A1 | 5/2004 | Chen |
| 2004/0110467 A1 | 6/2004 | Wang |
| 2004/0137863 A1 | 7/2004 | Walton et al. |
| 2004/0146014 A1 | 7/2004 | Hammons et al. |
| 2004/0146296 A1 | 7/2004 | Gerszberg et al. |
| 2004/0196935 A1 | 10/2004 | Nieto |
| 2005/0008100 A1 | 1/2005 | Chen |
| 2005/0037724 A1 | 2/2005 | Walley et al. |
| 2006/0013333 A1 | 1/2006 | Chen |
| 2006/0022747 A1 | 2/2006 | Chen et al. |
| 2006/0045191 A1 | 3/2006 | Vasanth et al. |
| 2006/0056541 A1 | 3/2006 | Chen et al. |
| 2007/0011716 A1 | 1/2007 | Koslov et al. |
| 2007/0121718 A1 | 5/2007 | Wang et al. |
| 2007/0297533 A1 | 12/2007 | Chitrapu et al. |

FOREIGN PATENT DOCUMENTS

| | | |
|---|---|---|
| CA | 2502924 | 5/2004 |
| DE | 3642213 | 12/1986 |
| EP | 0115218 | 8/1984 |
| EP | 0222076 | 8/1986 |
| EP | 0238822 | 9/1987 |
| EP | 0356096 | 2/1990 |
| EP | 0356096 A2 | 2/1990 |
| EP | 0491668 A2 | 6/1992 |
| EP | 0874474 A2 | 10/1998 |
| EP | 0929164 | 7/1999 |
| EP | 1011245 | 6/2000 |
| EP | 1054537 A1 | 11/2000 |
| EP | 1065854 | 1/2001 |
| EP | 1081903 A1 | 3/2001 |
| EP | 1335512 | 8/2003 |
| FR | 2696295 | 4/1994 |
| FR | 2724522 | 3/1996 |
| JP | 2-5631 | 1/1990 |
| JP | 2-95033 | 4/1990 |
| JP | 03139027 | 6/1991 |
| JP | 5-41683 | 2/1993 |
| JP | 5-114878 | 5/1993 |
| JP | 5-252084 | 9/1993 |
| JP | 2001069112 A | 3/2001 |
| JP | 2001-244832 | 9/2001 |
| JP | 2002118611 | 4/2002 |
| KR | 10-2001-0019997 | 3/2001 |
| KR | 2001 0019997 | 3/2001 |
| TW | 318983 B | 11/1997 |
| TW | 362333 B | 6/1999 |
| TW | 391107 B | 5/2000 |
| TW | 435009 B | 5/2001 |
| TW | 451569 B | 8/2001 |
| TW | 462168 B | 11/2001 |
| TW | 499800 B | 8/2002 |
| TW | 502506 B | 9/2002 |
| WO | 9836467 | 8/1998 |
| WO | WO 99/00957 | 1/1999 |
| WO | WO 99/20001 | 4/1999 |
| WO | WO 99/23718 | 5/1999 |
| WO | 99/33203 | 7/1999 |
| WO | 0079753 A1 | 12/2000 |
| WO | 0113532 A1 | 2/2001 |

| WO | WO 01/19013 | 3/2001 |
| WO | WO 01/39455 | 5/2001 |
| WO | WO 01/39456 | 5/2001 |
| WO | WO 02/073817 | 9/2002 |
| WO | WO 2005/074171 | 8/2005 |
| WO | WO 2005/086444 | 9/2005 |

OTHER PUBLICATIONS

Notice of Allowance dated Aug. 29, 2007 for U.S. Appl. No. 11/603,776, filed Nov. 22, 2006, Chen et al.
Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.
Notice of Allowance dated Jun. 20, 2007 for U.S. Appl. No. 10/693,135, filed Oct. 24, 2003, Chen.
Notice of Allowance dated Jul. 29, 2007 for U.S. Appl. No. 10/532,632, filed Apr. 25, 2003, Chen et al.
Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.
Wolcott, Ted J. et al.; "Uplink-Noise Limited Satellite Channels"; IEEE 1995; pp. 717-721; XP-00580915.
Seskar, Ivan et al.; "Implementation Aspects for Successive Interface Cancellation in DS/CDMA Systems"; Wireless Networks; 1998; pp. 447-452.
Earth Station Technology; 1986; pp. 404-412; XP-002248387.
Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.
Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26- 28, 2001, XP010560334.
Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.
Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.
Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.
Saleh, A.A.M. et al.: ."Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.
Ramchandran, Kannan et al.: Multiresolution Broadcast for Digital HDTV Using Joint Source/Channel Coding, IEEE, vol. 11, No. 1, Jan. 1993, pp. 6-22.
Meyr, Heinrich et al.; "Digital Communication Receivers —Synchronization, Channel Estimation, and Signal Processing"; John Wiley & Sons, Inc.; 1998; pp. 212-213 and 217-218; XP 002364874.
Meyr, Heinrich et al.; "Digital Communication Receivers —Synchronization, Channel Estimation, and Signal Processing"; John Wiley & Sons, Inc.; 1998; pp. 610-612; XP 002364876.
Fant, T. et al.; "Fourth-Power Law Clock Recovery with Prefiltering"; Proceedings of the International Conference on Communications (ICC), Geneva, May 23-26, 1993, New York, IEEE, US, vol. 3, May 23, 1993, pp. 811-815, XP010137089, ISBN: 0-7803-0950-2, Section I. Introduction.
Scott, R. P. et al.; Ultralow Phase Noise Ti:sapphire Laser Rivals 100 MHz Crystal Oscillator; Nov. 11-15, 2001; IEEE-Leos; pp. 1-2.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.
U.S. Appl. No. 10/519,375, filed Dec. 22, 2004, Ernest C. Chen, Non-final Communication dated Dec. 27, 2007.
U.S. Appl. No. 11/619,173, filed Jan. 2, 2007, Ernest C. Chen, Non-final Communicatiion dated Nov. 15, 2007.
U.S. Appl. No. 10/532,631, filed Apr. 25, 2005, Paul R. Anderson, Non-final Communication dated Nov. 19, 2007.
U.S. Appl. No. 10/691,032, filed Oct. 22, 2003, Weizheng Wang, Non-final Communication dated Nov. 16, 2007.
U.S. Appl. No. 10/519,322, filed Dec. 23, 2004, Ernest C. Chen, Notice of Allowance dated Dec. 11, 2007.
U.S. Appl. No. 10/532,619, filed Apr. 25, 2005, Ernest C. Chen, Notice of Allowance dated Dec. 26, 2007.
U.S. Appl. No. 11/603,776, filed Nov. 22, 2006, Ernest C. Chen, Notice of Allowance dated Jan. 2, 2008.
U.S. Appl. No. 10/692,539, filed Oct. 24, 2003, Ernest C. Chen, Non-final Communication dated May 31, 2007.
U.S. Appl. No. 10/692,539, filed Oct. 24, 2003, Ernest C. Chen, Notice of Allowance dated Sep. 20, 2007.
U.S. Appl. No. 10/532,632, filed Apr. 25, 2005, Ernest C. Chen, Notice of Allowance dated Jan. 7, 2008.
Non-final Office Communication dated Apr. 1, 2008 in U.S. Appl. No. 10/961,579, filed Oct. 8, 2004 by Ernest C. Chen.
Notice of Allowance dated Jun. 2, 2008 in U.S. Appl. No. 10/691,032, filed Oct. 22, 2003 by Weizheng W. Wang et al.
Notice of Allowance dated Jun. 2, 2008 in U.S. Appl. No. 10/693,135, filed Oct. 24, 2003 by Ernest C. Chen.
Canadian Office Action dated Jan. 22, 2008 in Canadian counterpart Application No. 2487817 corresponding to U.S. Appl. No. 10/165,710, filed Jun. 7, 2002 by Ernest C. Chen.
Canadian Office Action dated Jan. 23, 2008 in Canadian counterpart Application No. 2484313 corresponding to U.S. Appl. No. 10/962,346, filed Oct. 8, 2004 by Ernest C. Chen.
Canadian Office Action dated Feb. 5, 2008 in Canadian counterpart Application No. 2503530 corresponding to U.S. Appl. No. 10/532,632, filed Apr. 25, 2005 by Ernest C. Chen et al.
Canadian Office Action dated Feb. 27, 2008 in Canadian counterpart Application No. 2515167 corresponding to U.S. Appl. No. 10/913,927, filed Aug. 5, 2004 by Ernest C. Chen.
Canadian Office Action dated Apr. 22, 2008 in Canadian counterpart Application No. 2502924 corresponding to U.S. Appl. No. 10/532,619 filed Apr. 25, 2005 by Ernest C. Chen.
Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.
EPO Communication dated May 6, 2008 in European counterpart Application No. 03774848.0 corresponding to U.S. Appl. No. 10/532,582, filed Apr. 25, 2005 by Ernest C. Chen et al., now issued Feb. 6, 2007 as U.S. Patent No. 7,173,977.
EPO Communication dated May 6, 2008 in European counterpart Application No. 03777627.5 corresponding to U.S. Appl. No. 10/532,619, filed Apr. 25, 2005 by Ernest C. Chen.
Notice of Allowance dated May 22, 2008 in U.S. Appl. No. 10/532,619 filed Apr. 25, 2005 by Ernest C. Chen.
Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.
Non-final Communication dated Mar. 3, 2008 in U.S. Appl. No. 11/656,662, filed Jan. 22, 2007 by Ernest C. Chen et al.
Notice of Allowance dated Mar. 25, 2008 in U.S. Appl. No. 11/653,517, filed Jan. 16, 2007 by Ernest C. Chen.
EPO Communication dated Mar. 11, 2008 in European counterpart Application No. 03777694.5 of corresponding U.S. Appl. No. 10/532,509, filed Oct. 17, 2003 by Ernest Chen et al., now issued as Patent No. 7,230,480.
EPO Communication dated Mar. 7, 2008 in European counterpart Application No. 03742393.6 of corresponding U.S. Appl. No. 10/519,375 filed Jul. 3, 2003 by Ernest Chen et al.

Canadian Office Action dated Sep. 12, 2007 in Canadian counterpart Application No. 2491259 of corresponding U.S. Appl. No. 10/519,375, filed Jul. 3, 2003 by Ernest Chen et al.
Norwegian Office Action dated Nov. 15, 2007 in Norwegian counterpart Application No. 20026115 of corresponding U.S. Appl. No. 09/844,401, filed Apr. 27, 2001 by Ernest Chen, now issued as Patent No. 7,209,524.
EPO Communication dated Aug. 3, 2007 in European counterpart Application No. 03794510.2 of corresponding U.S. Appl. No. 10/236,414, filed Sep. 6, 2002 by Ernest Chen et al.
Non-final Communication dated Oct. 16, 2007 in U.S. Appl. No. 10/962,346, filed Oct. 8, 2004 by Ernest Chen.
EPO Communication dated Dec. 13, 2007 in European counterpart application No. 05254902.9.
Canadian Office Action dated Aug. 5, 2008 in Canadian counterpart Application No. 2503532 corresponding to U.S. Appl. No. 10/532,509, filed Oct. 17, 2003 by Ernest C. Chen et al., now issued Jun. 12, 2007 as US Patent No. 7,230,480.
Final Rejection dated Sep. 9, 2008 in U.S. Appl. No. 11/656,662, filed Jan. 22, 2007 by Ernest C. Chen et al.
EPO Summons to attend Oral Proceedings dated Jul. 18, 2008 in European counterpart Application No. 02728894.3 corresponding to U.S. Appl. No. 09/844,401, filed Apr. 27, 2001 by Ernest Chen, now issued Apr. 24, 2007 as US Patent No. 7,209,524.
Taiwanese Office Action dated May 14, 2008 in Taiwan counterpart Application No. 092129629 corresponding to U.S. Appl. No. 10/532,631, filed Apr. 25, 2005 by Paul R. Anderson et al.
Chinese Office Action dated Aug. 22, 2008 in Chinese Patent Application No. 200410100591.6, filed Oct. 10, 2004 by Ernest Chen.
Non-final Office Action dated Apr. 30, 2008 in U.S. Appl. No. 10/962,346, filed Oct. 8, 2004 by Ernest C. Chen.
Notice of Allowance dated Oct. 23, 2008 in U.S. Appl. No. 10/961,579, filed Oct. 8, 2004 by Ernest C. Chen.
Notice of Allowance dated Oct. 23, 2008 in U.S. Appl. No. 10/962,346, filed Oct. 8, 2004 by Ernest C. Chen.
Final Rejection dated Jun. 24, 2008 in U.S. Appl. No. 10/519,375, filed Dec. 22, 2004 by Ernest C. Chen et al.
Notice of Allowance dated Jun. 13, 2008 in U.S. Appl. No. 10/532,524, filed Apr. 25, 2005 by Ernest C. Chen et al.
European Search Report and Search Opinion dated Jun. 13, 2008 in European counterpart Application No. 07075745.5 corresponding to U.S. Appl. No. 09/844,401, filed Apr. 27, 2001 by Ernest C. Chen, now issued Apr. 24, 2007 as US Patent No. 7,209,524.
El-Gamal, Abbas and Cover, Thomas M.; "Multiple User Information Theory"; Proceedings of IEEE; vol. 68, No. 12; Dec. 1980; pp. 1466-1483; XP007904837.
Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.
Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.
Notice of Allowance dated Apr. 13, 2009 in U.S. Appl. No. 12/176,533, filed Jul. 21, 2008 by Ernest C. Chen et al.
EPO Communication dated Feb. 24, 2009 in European Patent Divisional Application No. 07075745.5 filed Apr. 24, 2002 (parent filing date) by Ernest C. Chen.
Canadian Office Action dated Oct. 3, 2008 in Canadian Patent Application No. 2491259 filed Jul. 3, 2003 by Ernest C. Chen et al.
Non-final Office Action dated Mar. 5, 2009 in U.S. Appl. No. 10/519,375, filed Dec. 22, 2004 by Ernest C. Chen et al.

Non-final Office Action dated Mar. 17, 2009 in U.S. Appl. No. 12/329,456, filed Dec. 5, 2008 by Ernest C. Chen et al.
Israel Office Action dated Feb. 15, 2009 in Israel Patent Application No. 164482 filed Oct. 10, 2004 by Ernest C. Chen.
Notice of Allowance dated May 6, 2008 in U.S. Appl. No. 10/532,631, filed Apr. 25, 2005 by Paul R. Anderson et al.
Notice of Allowance dated Apr. 30, 2008 in U.S. Appl. No. 11/603,776, filed Nov. 22, 2006 by Ernest Chen et al.
EPO Communication dated Apr. 4, 2008 in European counterpart Application No. 03757359.9 corresponding to U.S. Appl. No. 10/165,710, filed Jun. 7, 2002 by Ernest Chen.
Notice of Allowance dated Mar. 12, 2008 in U.S. Appl. No. 11/655,001, filed Jan. 18, 2007 by Weizheng Wang et al.
Japanese Office Action dated Mar. 4, 2008 in Japanese counterpart Application No. 2004-297297 corresponding to U.S. Appl. No. 10/962,346, filed Oct. 8, 2004 by Ernest Chen.
EPO Communication dated Feb. 26, 2008 in European counterpart Application No. 04256234.8 corresponding to U.S. Appl. No. 10/962,346, filed Oct. 8, 2004 by Ernest Chen.
EPO Communication dated Feb. 7, 2008 in European counterpart Application No. 03742400.9 and received from European representative on Feb. 14, 2008 and corresponding to U.S. Appl. No. 10/519,322, filed Dec. 23, 2004 by Ernest Chen et al.
Notice of Allowance dated May 8, 2008 in U.S. Appl. No. 11/619,173, filed Jan. 2, 2007 by Ernest Chen et al.
Notice of Allowance dated May 6, 2008 in U.S. Appl. No. 10/532,632, filed Apr. 25, 2005 by Ernest Chen et al.
Notice of Allowance dated Apr. 21, 2008 in U.S. Appl. No. 10/519,322, filed Dec. 23, 2004 by Ernest Chen et al.
Canadian Office Action dated Nov. 29, 2007 in Canadian counterpart Application No. 2442400 corresponding to U.S. Appl. No. 09/844,401, filed Apr. 27, 2001 by Ernest Chen, now issued Apr. 27, 2007 as US Patent No. 7,209,524.
Non-final Office Action dated Dec. 16, 2008 in U.S. Appl. No. 12/176,533, filed Jul. 21, 2008 by Ernest C. Chen et al.
EPO Communication dated Oct. 17, 2008 in European Patent Application No. 03774848.0 filed Oct. 15, 2003 by Ernest Chen et al.
EPO Communication dated Nov. 18, 2008 in European Patent Application No. 03742393.6 filed Jul. 3, 2003 by Ernest Chen et al.
Notice of Allowance dated Dec. 2, 2008 in U.S. Appl. No. 11/656,662, filed Jan. 22, 2007 by Ernest Chen et al.
ROC (Taiwan) Search Report dated Apr. 3, 2009 in ROC (Taiwan) Patent Application No. 092129498 filed Oct. 24, 2003 by Ernest C. Chen et al., received by Applicants on Aug. 11, 2009.
ROC (Taiwan) Search Report dated Apr. 3, 2009 in ROC (Taiwan) Patent Application No. 092117948 filed Jul. 1, 2003 by Ernest C. Chen et al., received by Applicants on Aug. 11, 2009.
ROC (Taiwan) Search Report completed May 30, 2009 in ROC (Taiwan) Patent Application No. 092129644 filed. Oct. 24, 2003 by Ernest C. Chen, 1 page.
Notice of Allowance dated Sep. 15, 2009 in U.S. Appl. No. 10/519,375 filed Dec. 22, 2004 by Ernest C. Chen et al.
Notice of Allowance dated Sep. 4, 2009 in U.S. Appl. No. 12/329,456 filed Dec. 5, 2008 by Ernest C. Chen et al.
Reverse Decision on Appeal dated Aug. 17, 2009 in U.S. Appl. No. 10/236,414 filed Sep. 6, 2002 by Ernest C. Chen et al.
Canadian Office Action dated Sep. 17, 2009 in Canadian Patent Application No. 2503432 filed Oct. 20, 2003 by Paul R. Anderson et al.
EPO Summons to attend oral proceedings dated Sep. 16, 2009 in European Patent Application No. 03757359.9 filed Jun. 5, 2003 by Ernest C. Chen.

* cited by examiner

CARRIER TO NOISE RATIO ESTIMATIONS FROM A RECEIVED SIGNAL

CROSS-REFERENCE TO RELATED APPLICATIONS

This is a continuation-in-part application and claims the benefit under 35 U.S.C. Section 120 of the following commonly-assigned U.S. utility patent application, which is incorporated by reference herein:

Utility application Ser. No. 09/844,401, filed Apr. 27, 2001, by Ernest C. Chen, entitled "LAYERED MODULATION FOR DIGITAL SIGNALS," issued Apr. 24, 2007 as U.S. Pat. No. 7,209,524.

BACKGROUND OF THE INVENTION

1. Field of the Invention

The present invention relates to systems and methods for estimating the carrier to noise ratio (CNR) from received signals, particularly signals using layered modulations.

2. Description of the Related Art

Digital signal communication systems have been used in various fields, including digital TV signal transmission, either terrestrial or satellite. As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate conventional 8PSK or 16QAM signals. As a result, legacy customers with QPSK receivers must upgrade their receivers in order to continue to receive any signals transmitted with an 8PSK or 16QAM modulation.

It is advantageous for systems and methods of transmitting signals to accommodate enhanced and increased data throughput without requiring additional frequency. In addition, it is advantageous for enhanced and increased throughput signals for new receivers to be backwards compatible with legacy receivers. There is further an advantage for systems and methods which allow transmission signals to be upgraded from a source separate from the legacy transmitter.

It has been proposed that a layered modulation signal, transmitting non-coherently both upper and lower layer signals, can be employed to meet these needs. See Utility application Ser. No. 09/844,401. In backwards compatible implementations, the lower layer signal is transparent or "invisible" to the upper layer signal, the primary signal distribution layer, thereby providing backward compatibility with legacy satellite receivers. Such layered modulation systems allow higher information throughput with backwards compatibility. However, even when backward compatibility is not required (such as with an entirely new system), layered modulation can still be advantageous because it requires a TWTA peak power significantly lower than that for a conventional 8PSK or 16QAM modulation format for a given throughput.

However, to receive such layered modulation signals requires reconstruction of the upper layer signals to remove them from the total signal for lower layer signal processing to occur. Minimizing the CNR is clearly an important factor in producing usable layered signals. CNR degradation occurs primarily as a consequence of receiver thermal noise and satellite traveling wave tube amplifier (TWTA) non-linearity. An accurate measurement of the CNR is an important component of an operational layered modulation scheme. Previously, CNR measurement has been performed by first demodulating and FEC decoding the received signal based upon an analog to digital (A/D) signal at base-band. However, layered modulation and other systems would be advantaged by techniques which measure CNR without FEC decoding and even without completely demodulating the signal. This has the advantage of speeding up the CNR estimation process for both on-line real time systems and off-line computer processing environments.

Accordingly, there is a need for systems and methods that enable CNR measurement without first demodulating the received signal based upon an analog to digital (A/D) signal at base-band. The present invention meets these needs.

SUMMARY OF THE INVENTION

Layered modulation (LM) reconstructs the upper layer signal and removes it from the received signal to leave a lower-layer signal. Lower layer signal demodulation performance requires good signal cancellation, which in turn requires the reconstructed signal to include accurate amplitude and phase effects from signal propagation path, filter and low noise block (LNB). Values of these parameters change from system to system and therefore must be estimated for each system.

A major difficulty in the implementation of the layered modulation techniques disclosed in Utility application Ser. No. 09/844,401, filed Apr. 27, 2001, by Ernest C. Chen, entitled "LAYERED MODULATION FOR DIGITAL SIGNALS," was that the upper layer signal required excessive satellite TWTA power, beyond the current levels for a typical continental United States (CONUS) coverage. The present invention minimizes the required powers to levels of current typical TWTA power limits. Therefore, there is no need to wait for TWTA power technology to further develop before layered modulation can be implemented.

The layered modulation technique as previously disclosed in Utility application Ser. No. 09/844,401 established that the upper layer signal must carry a power substantially higher than that of the lower layer signal in order for the technique to operate. It also recognized that typically backwards-compatible (BWC) applications need more power than non-BWC applications for the upper layer signal. Exemplary deployment scenarios required power levels of upper layer signal significantly beyond satellite TWTA power technology for BWC applications.

CNR degradation in a transmitted signal occurs primarily from ground receiver thermal noise and satellite TWTA non-linearity. The present invention provides for CNR measurement techniques used in signal demodulation in an advanced layered modulation (ALM) distribution scheme. Outputs can be taken at the A/D converter, the timing recovery loop (TRL) or two output points of the carrier recovery loop (CRL).

Previously, CNR measurement has not been performed through signal to noise ratio comparisons to predict signal responses. In some embodiments of the present invention the need to completely demodulate and FEC decode the received signal is eliminated because the CNR measurement can be based on an analog to digital (A/D) signal output at baseband.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

U.S. Utility application Ser. No. 09/844,401 describes a technique for transmitting digital information using multiple non-coherent carriers occupying overlapping portions of an RF band or channel. This technique is at its most efficient in a satellite transmission environment where each of the interfering carriers pass through a separate TWTA on the satellite. Each amplifier can usually be operated at saturation, generally the most efficient use of such TWTAs.

Sophisticated ground receivers that employ the technique described in U.S. Utility application Ser. No. 09/844,401 can demodulate each of these carriers where the frequency spectrum of one carrier can substantially or completely overlap the frequency spectrum used to transmit the other. This invention describes a number of techniques that can be employed to accurately and rapidly calculate the CNR of the received signal in layered modulation and other satellite transmission environments.

2. Video Distribution System

Figure 1:
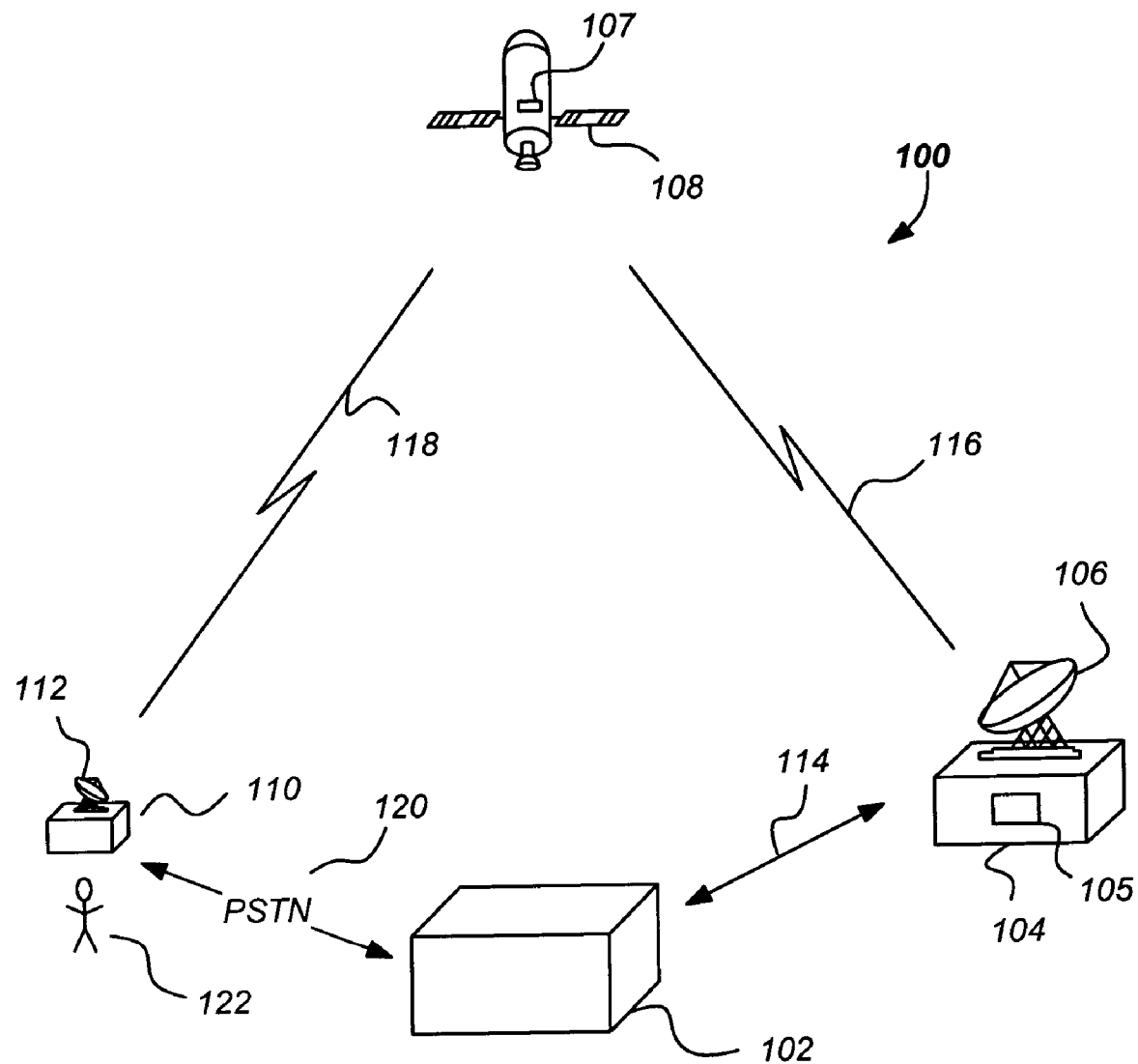
FIG. 1 is a diagram illustrating an overview of a single satellite video distribution system.

FIG. 1 is a diagram illustrating an overview of a single satellite video distribution system 100. The video distribution system 100 comprises a control center 102 in communication with an uplink center 104 via a ground or other link 114 and with a subscriber receiver station 110 via a public switched telephone network (PSTN) or other link 120. The control center 102 provides program material (e.g. video programs, audio programs and data) to the uplink center 104 and coordinates with the subscriber receiver stations 110 to offer, for example, pay-per-view (PPV) program services, including billing and associated decryption of video programs.

The uplink center 104 receives program material and program control information from the control center 102, and using an uplink antenna 106 and transmitter 105, transmits the program material and program control information to the satellite 108 via feeder link signal 116. The satellite 108 receives and processes this information, and transmits the video programs and control information to the subscriber receiver station 110 via downlink signal 118 using transmitter or transponder 107. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB, which is used to receive signals reflected from the subscriber antenna. The offset feed positions the LNB out of the way so it does not block any surface area of the antenna minimizing attenuation of the incoming microwave signal.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite-based video distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well.

2.1 Uplink Configuration

Figure 2:
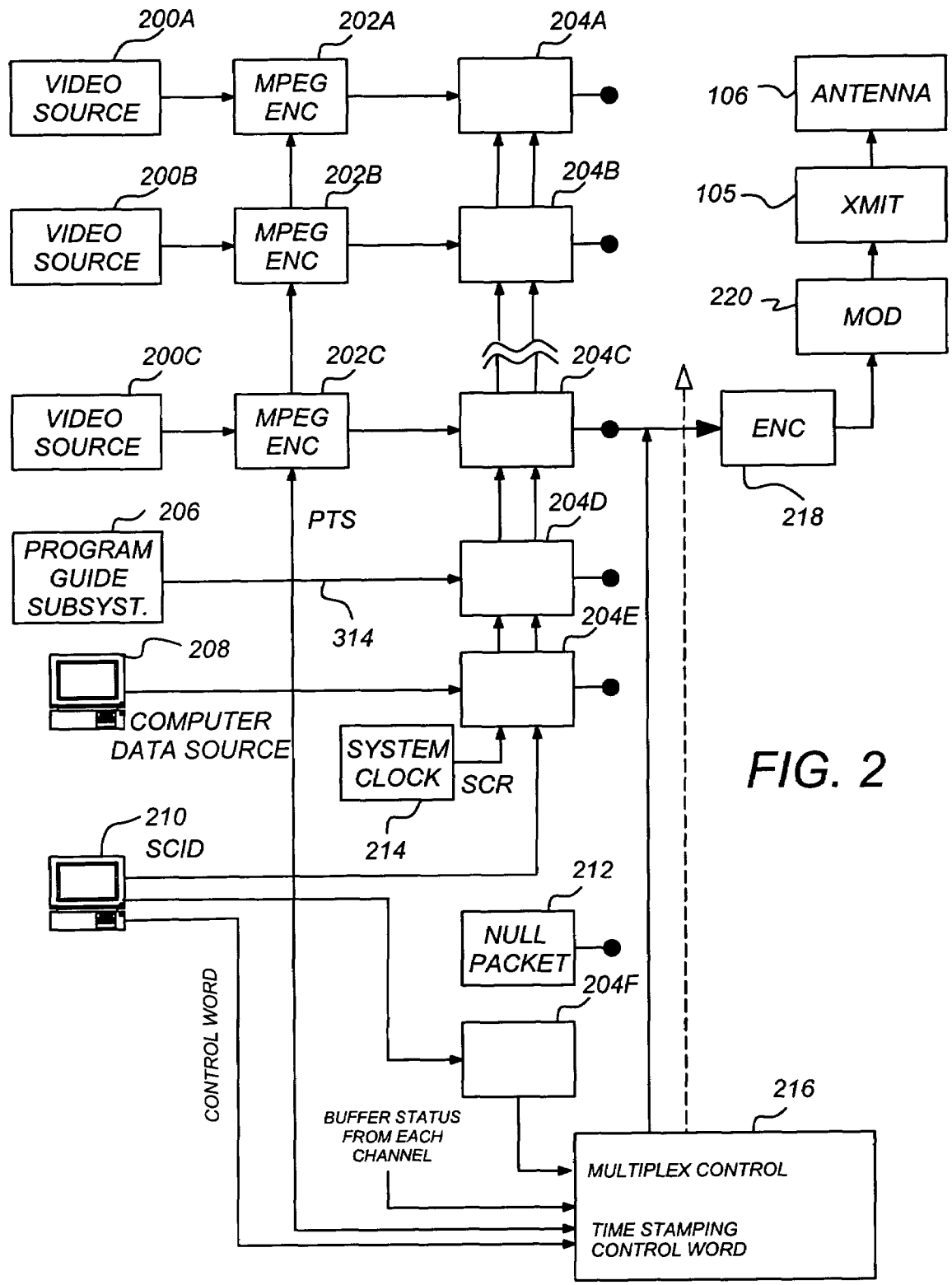
FIG. 2 is a block diagram showing a typical uplink configuration for a single satellite transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which may be augmented respectively with one or more audio channels for high fidelity music, soundtrack information, or a secondary audio program for transmitting foreign languages), a data channel from a program guide subsystem 206 and computer data information from a computer data source 208.

Typical video channels are provided by a program source 200A-200C of video material (collectively referred to hereinafter as program source(s) 200). The data from each program source 200 is provided to an encoder 202A-202C (collectively referred to hereinafter as encoder(s) 202). Each of the encoders accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each program source 200.

The output data packets are assembled using a reference from the system clock 214 (SCR), and from the conditional access manager 210, which provides the service channel identifier (SCID) to the packetizers 204 for use in generating the data packets. These data packets are then multiplexed into serial data and transmitted.

2.2 Broadcast Data Stream Format and Protocol

Figure 3A:
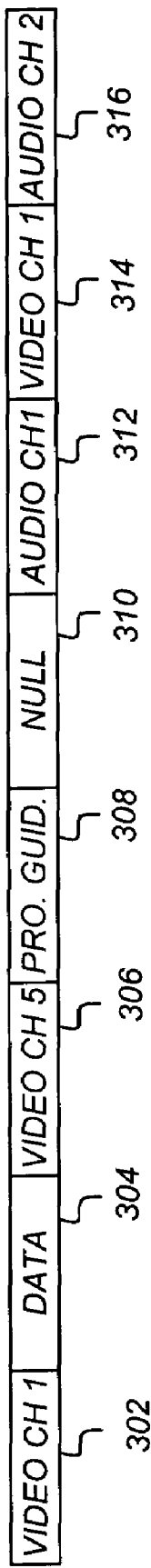
FIG. 3A is a diagram of a representative data stream.

FIG. 3A is a diagram of a representative data stream. The first packet 302 comprises information from video channel 1 (data coming from, for example, the first video program source 200A). The next packet 304 comprises computer data information that was obtained, for example from the computer data source 208. The next packet 306 comprises information from video channel 5 (from one of the video program sources 200). The next packet 308 comprises program guide information such as the information provided by the program guide subsystem 206. As shown in FIG. 3A, null packets 310 created by the null packet module 212 may be inserted into the data stream as desired followed by further data packets 312, 314, 316 from the program sources 200.

Referring back to FIG. 2, the data stream therefore comprises a series of packets (302-316) from any one of the data sources (e.g. program sources 200, program guide subsystem 206, computer data source 208) in an order determined by the controller 216. The data stream is encrypted by the encryption module 218, modulated by the modulator 220 (typically using a QPSK modulation scheme), and provided to the transmitter 105, which broadcasts the modulated data stream on a frequency bandwidth to the satellite via the antenna 106. The receiver 500 at the receiver station 110 receives these signals, and using the SCID, reassembles the packets to regenerate the program material for each of the channels.

Figure 3B:
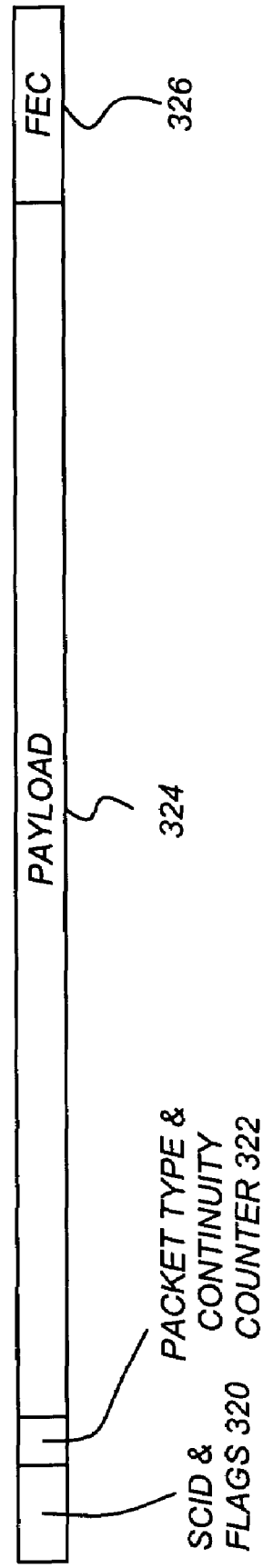
FIG. 3B is a diagram of a representative data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control other features. The second packet segment 322 is made up of a 4-bit packet type indicator and a 4-bit continuity counter. The packet type generally identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which in the cases of packets 302 or 306 is a portion of the video program provided by the video program source 200. The final packet segment 326 is data required to perform forward error correction.

Figure 4:
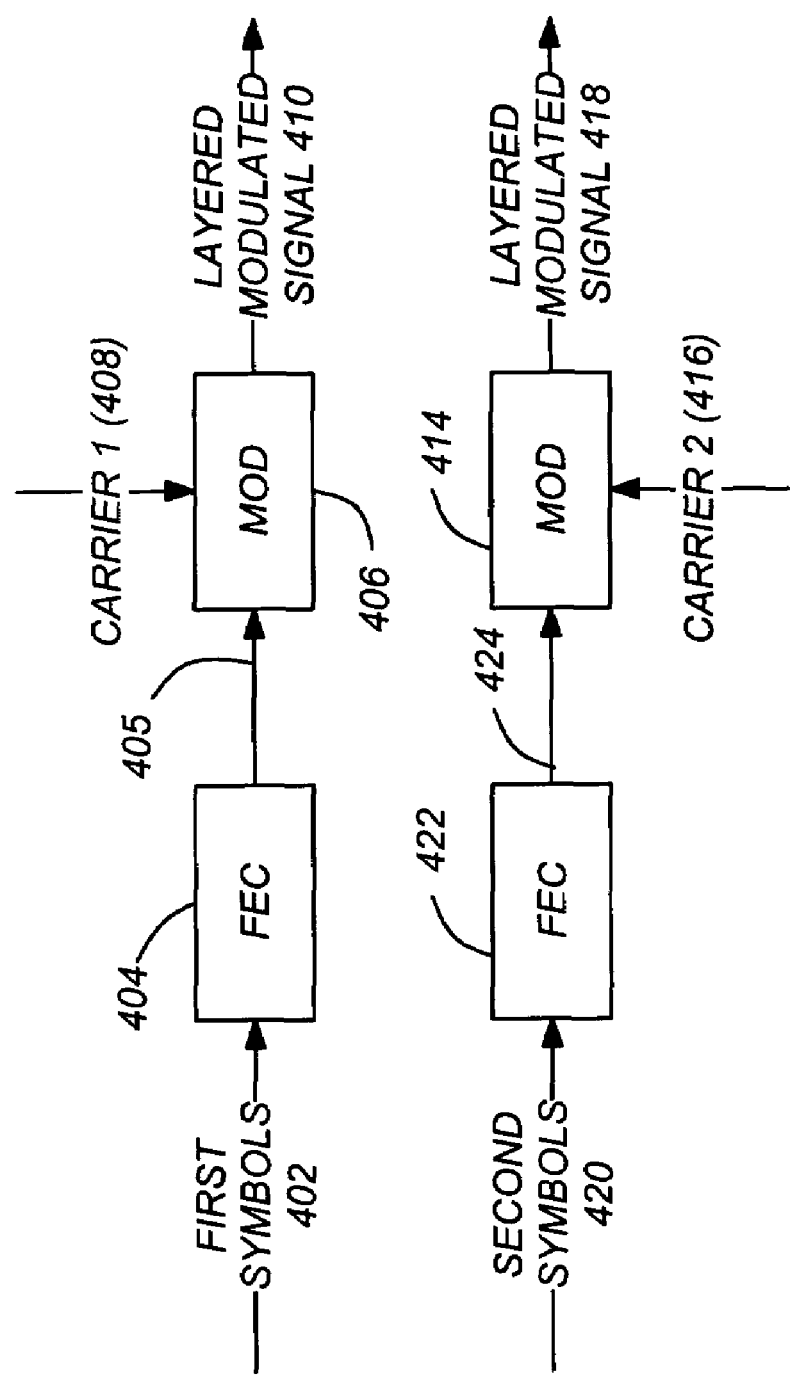
FIG. 4 is a block diagram showing one embodiment of the modulator for the feeder link signal.

FIG. 4 is a block diagram showing one embodiment of the modulator 220. The modulator 220 optionally comprises a forward error correction (FEC) encoder 404 which accepts the first signal symbols 402 and adds redundant information that are used to correct transmission errors. The coded symbols 405 are modulated by modulator 406 according to a first carrier 408 to produce an upper layer modulated signal 410. Second symbols 420 are likewise provided to an optional second FEC encoder 422 to produce coded second symbols 422. The coded second symbols 422 are provided to a second modulator 414, which modulates the coded second signals according to a second carrier 416 to produce a lower layer modulated signal 418. The upper layer modulated signal 410 and the lower layer modulated signal 418 are therefore uncorrelated, and the frequency range used to transmit each layer can substantially or completely overlap the frequency spectrum used to transmit the other.

In FIG. 4, the frequency spectrum of the upper layer signal 410 may overlap the frequency spectrum of the lower layer signal 418. The upper layer signal 410, however, must be a sufficiently greater amplitude signal than the lower layer signal 418, in order to maintain usable signal constellations shown in FIG. 6 and FIG. 7. The modulator 220 may also employ pulse shaping techniques to maximize use of the limited channel bandwidth with minimum inter-symbol interference in the receiver. Although the same pulse shaping may be applied to both layers, different pulse shaping can be applied to each layer as well.

It should be noted that it may be more efficient to retrofit an existing system by using a transponder on a separate satellite 108 to transmit the lower layer downlink signal over the existing legacy downlink signal rather than replacing the legacy satellite with one that will transmit both downlink signal layers. Emphasis can be given to accommodating the downlink legacy signal in implementing a layered downlink broadcast.

2.3 Integrated Receiver/Decoder

Figure 5:
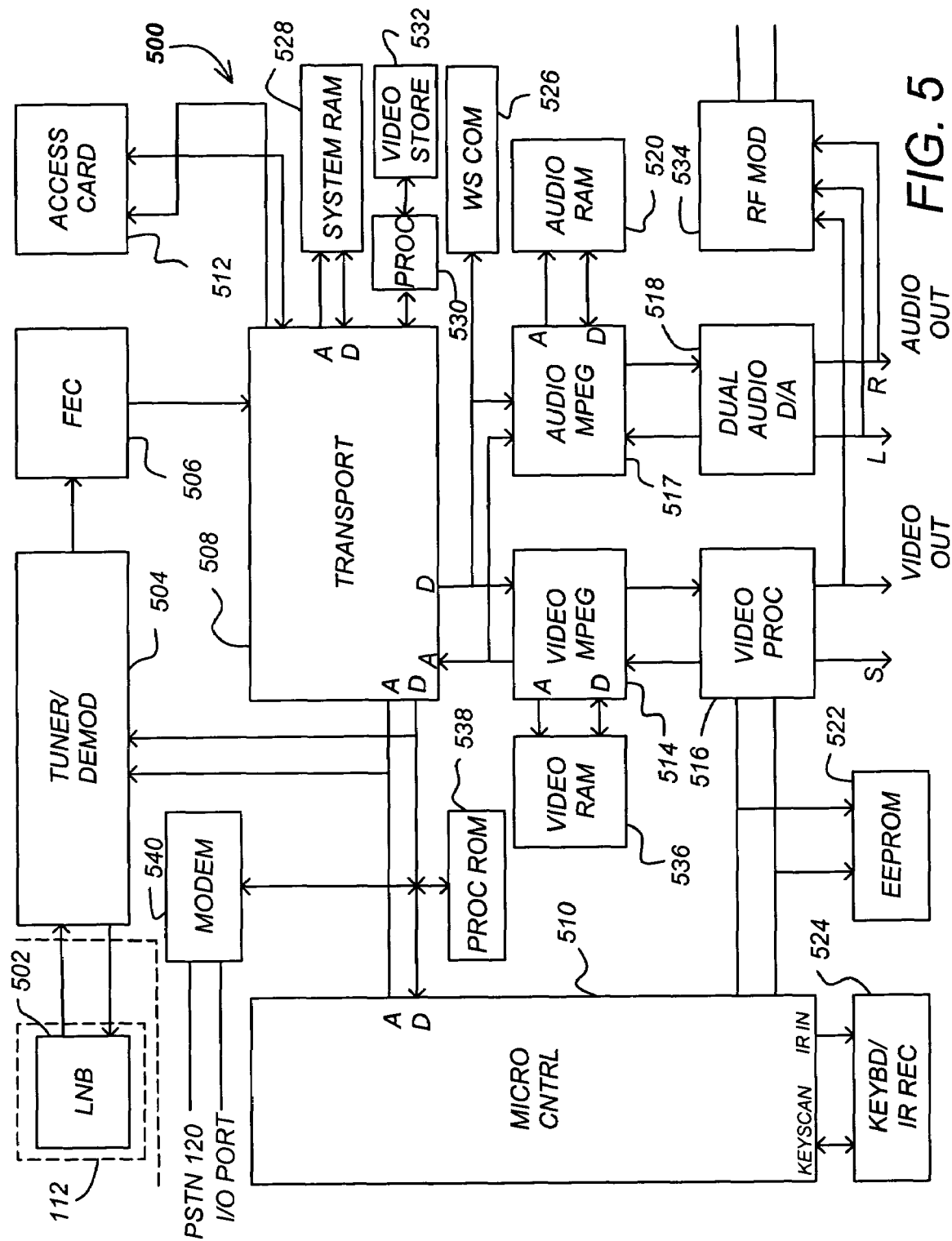
FIG. 5 is a block diagram of an integrated receiver/decoder (IRD)

FIG. 5 is a block diagram of an IRD 500 (also hereinafter alternatively referred to as receiver 500). The receiver 500 comprises a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the IRD's 500 tuner/demodulator 504. Typically, the LNB 502 may provide either a dual or a single output. The single-output LNB 502 has only one RF connector, while the dual output LNB 502 has two RF output connectors and can be used to feed a second tuner 504, a second receiver 500, or some other form of distribution system.

The tuner/demodulator 504 isolates a single, digitally modulated 24 MHz transponder signal, and converts the modulated data to a digital data stream. The digital data stream is then supplied to an FEC decoder 506. This allows the IRD 500 to reassemble the data transmitted by the uplink center 104 (which applied the forward error correction to the desired signal before transmission to the subscriber receiving station 110) verifying that the correct data signal was received, and correcting errors, if any. The error-corrected data may be fed from the FEC decoder module 506 to the transport module 508 via an 8-bit parallel interface.

The transport module 508 performs many of the data processing functions performed by the IRD 500. The transport module 508 processes data received from the FEC decoder module 506 and provides the processed data to the video MPEG decoder 514 and the audio MPEG decoder 517. As needed the transport module employs system RAM 528 to process the data. In one embodiment of the present invention, the transport module 508, video MPEG decoder 514 and audio MPEG decoder 517 are all implemented on integrated circuits. This design promotes both space and power efficiency, and increases the security of the functions performed within the transport module 508. The transport module 508 also provides a passage for communications between the microcontroller 510 and the video and audio MPEG decoders 514, 517. As set forth more fully hereinafter, the transport module also works with the conditional access module (CAM) 512 to determine whether the receiver 500 is permitted to access certain program material. Data from the transport module 508 can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a removable smart card, having contacts cooperatively interacting with contacts in the IRD 500 to pass information. In order to implement the processing performed in the CAM 512, the IRD 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 516, which converts the digital video information received from the video MPEG module 514 into an output signal usable by a display or other output device. By way of example, processor 516 may comprise a National TV Standards Committee (NTSC) or Advanced Television Systems Committee (ATSC) encoder. In one embodiment of the invention both S-Video and ordinary video (NTSC or ATSC) signals are provided. Other outputs may also be utilized, and are advantageous if high definition programming is processed.

Audio data is likewise decoded by the MPEG audio decoder 517. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, Hill, 1998, which is hereby incorporated by reference herein.

The microcontroller 510 receives and processes command signals from a remote control, an IRD 500 keyboard interface, and/or other suitable input device 524. The microcontroller 510 receives commands for performing its operations from a processor programming memory, which permanently stores such instructions for performing such commands. The processor programming memory may comprise a read only memory (ROM) 538, an electrically erasable programmable read only memory (EEPROM) 522 or, similar memory device. The microcontroller 510 also controls the other digital devices of the IRD 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports.

The present invention also comprises a local storage unit such as the video storage device 532 for storing video and/or audio data obtained from the transport module 508. Video storage device 532 can be a hard disk drive, a read/writable compact disc of DVD, a solid state RAM, or any other suitable storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video data from the video storage device 532. The video storage processor 530 may also comprise memory for buffering data passing into and out of the video storage device

532. Alternatively or in combination with the foregoing, a plurality of video storage devices 532 can be used. Also alternatively or in combination with the foregoing, the microcontroller 510 can also perform the operations required to store and or retrieve video and other data in the video storage device 532.

The video processing module 516 input can be directly supplied as a video output to a viewing device such as a video or computer monitor. In addition, the video and/or audio outputs can be supplied to an RF modulator 534 to produce an RF output and/or 8 vestigal side band (VSB) suitable as an input signal to a conventional television tuner. This allows the receiver 500 to operate with televisions without a video output.

Each of the satellites 108 comprises a transponder, which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCIDs.

Preferably, the IRD 500 also receives and stores a program guide in a memory available to the microcontroller 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite transponders and SCIDs, and also provide TV program listing information to the subscriber 122 identifying program events.

The functionality implemented in the IRD 500 depicted in FIG. 5 can be implemented by one or more hardware modules, one or more software modules defining instructions performed by a processor, or a combination of both.

The present invention provides for the modulation of signals at different power levels and advantageously for the signals to be non-coherent from each layer. In addition, independent modulation and coding of the signals may be performed. Backwards compatibility with legacy receivers, such as a quadrature phase shift keying (QPSK) receiver is enabled and new services are provided to new receivers. A typical new receiver of the present invention uses two demodulators and one re-modulator (which can be combined in one or more processors) as will be described in detail hereafter.

In a typical backwards-compatible embodiment of the present invention, the legacy QPSK signal is boosted in power to a higher transmission (and reception) level. The legacy receiver will not be able to distinguish the new lower layer signal, from additive white Gaussian noise, and thus operates in the usual manner. The optimum selection of the layer power levels is based on accommodating the legacy equipment, as well as the desired new throughput and services.

The new lower layer signal is provided with a sufficient carrier to thermal noise ratio to function properly. The new lower layer signal and the boosted legacy signal are non-coherent with respect to each other. Therefore, the new lower layer signal can be implemented from a different TWTA and even from a different satellite. The new lower layer signal format is also independent of the legacy format, e.g., it may be QPSK or 8PSK, using the conventional concatenated FEC code or using a new Turbo code. The lower layer signal may even be an analog signal.

The combined layered signal is demodulated and decoded by first demodulating the upper layer to remove the upper carrier. The carrier-stabilized layered signal may then have the upper layer FEC decoded and the output upper layer symbols communicated to the upper layer transport. The upper layer symbols are also employed in a re-modulator, to generate an idealized upper layer signal. The idealized upper layer signal is then subtracted from the stable layered signal to reveal the lower layer signal. The lower layer signal is then demodulated and FEC decoded and communicated to the lower layer transport.

Signals, systems and methods using the present invention may be used to supplement a pre-existing transmission compatible with legacy receiving hardware in a backwards-compatible application or as part of a preplanned layered modulation architecture providing one or more additional layers at a present or at a later date.

2.4 Layered Signals

Figure 6B:
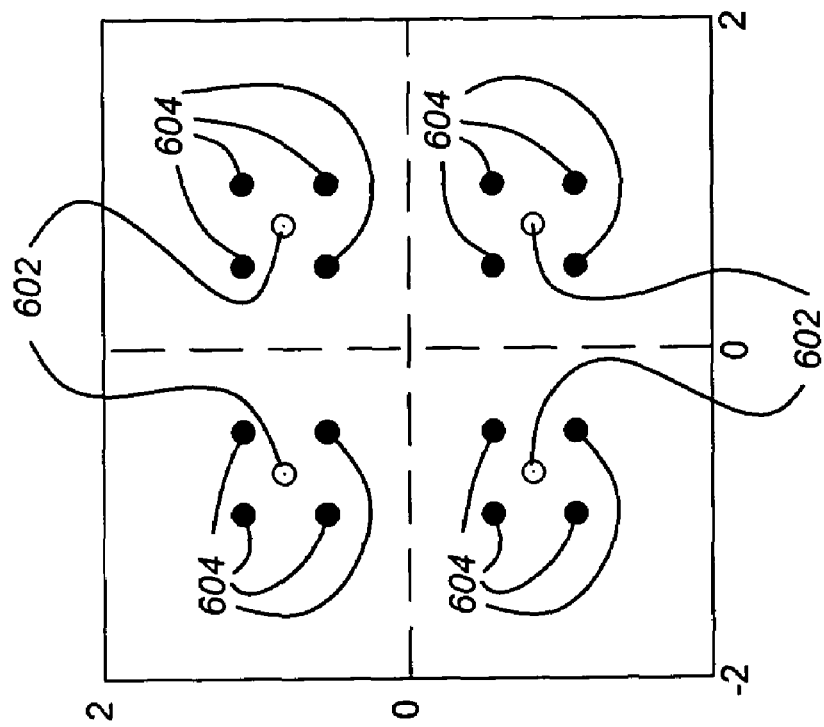
FIGS. 6A-6C are diagrams illustrating the basic relationship of signal layers in a layered modulation transmission.
Figure 6A:
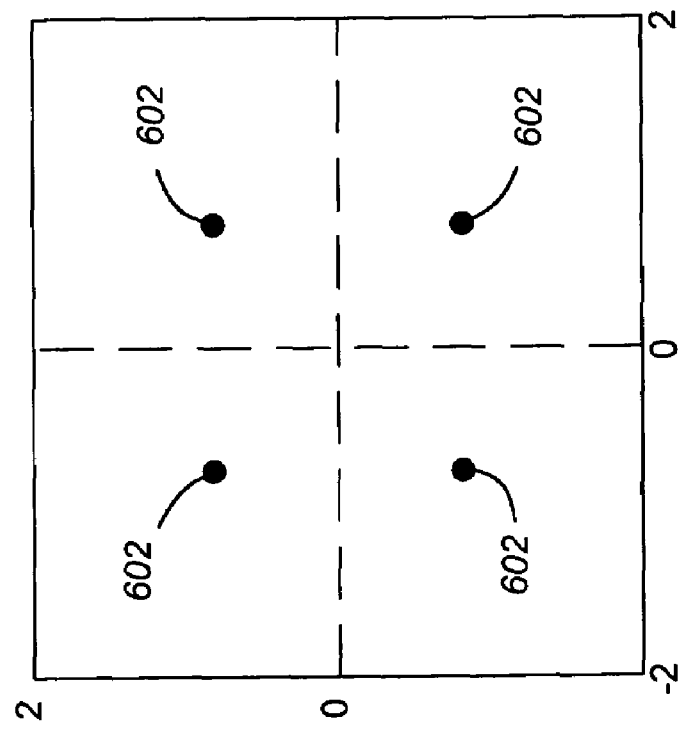
Figure 6C:
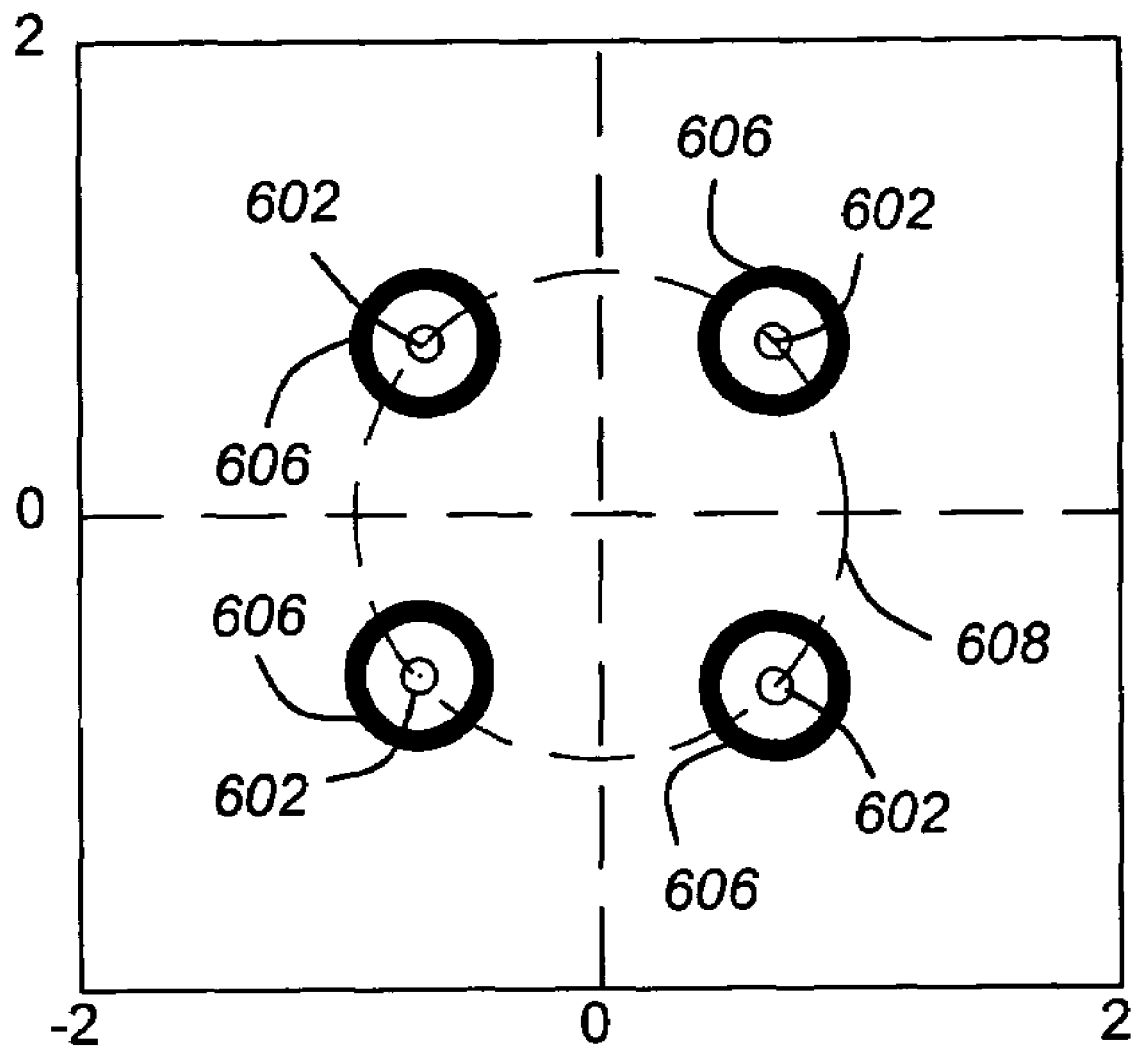

FIGS. 6A-6C illustrate the basic relationship of signal layers in a received layered modulation transmission. FIG. 6A illustrates an upper layer signal constellation 600 of a transmission signal showing the signal points or symbols 602. FIG. 6B illustrates the lower layer signal constellation of symbols 604 over the upper layer signal constellation 600 where the layers are coherent (or synchronized). FIG. 6C illustrates a lower layer signal 606 of a second transmission layer over the upper layer constellation where the layers are non-coherent. The lower layer 606 rotates about the upper layer constellation point 602 due to the relative modulating frequencies of the two layers in a non-coherent transmission. Both the upper and lower layers rotate about the origin of FIG. 6C due to the first layer modulation frequency as described by path 608.

Figure 7B:
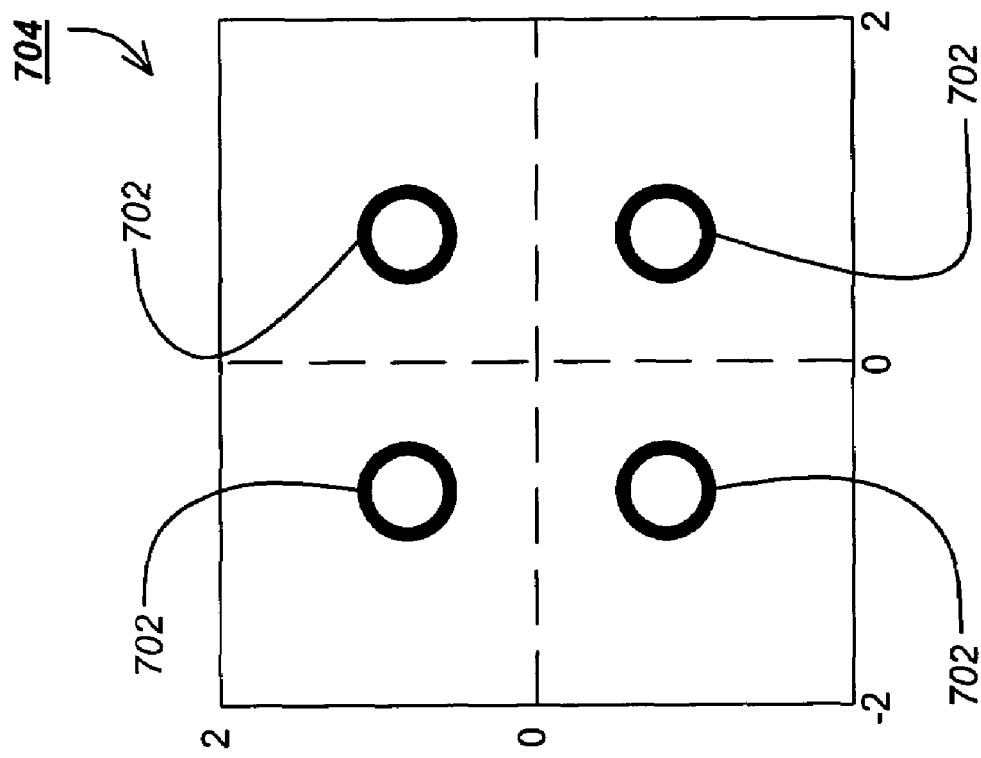
FIGS. 7A-7C are diagrams illustrating a signal constellation of a second transmission layer over the first transmission layer after first layer demodulation.
Figure 7A:
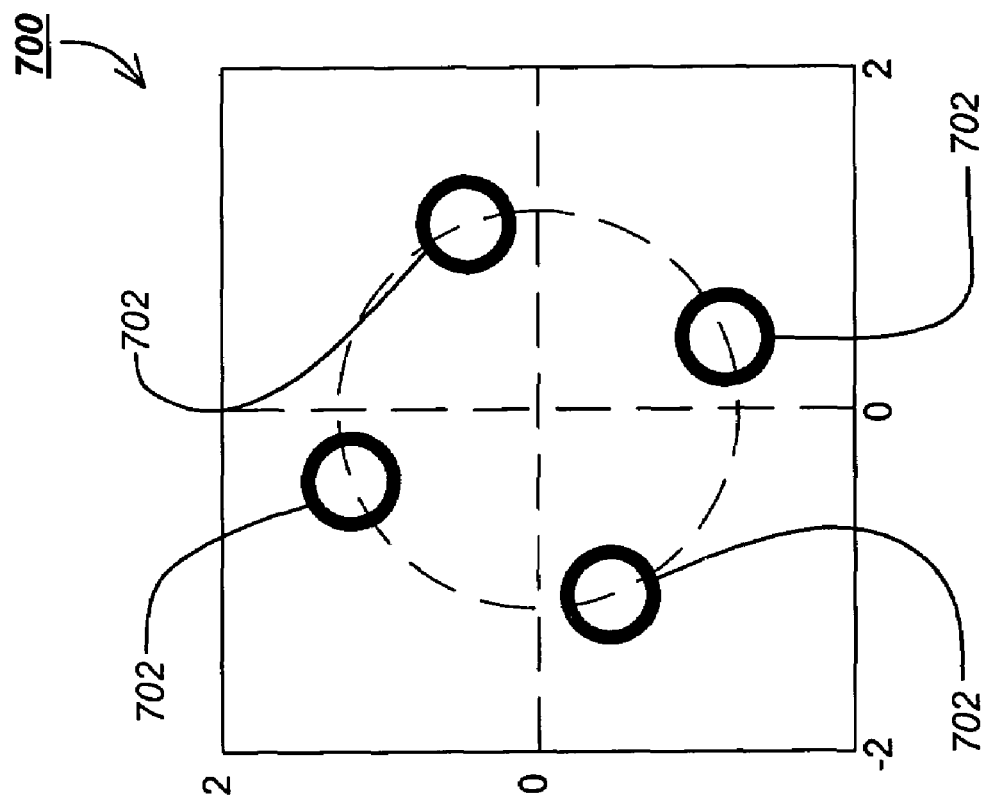
Figure 7C:
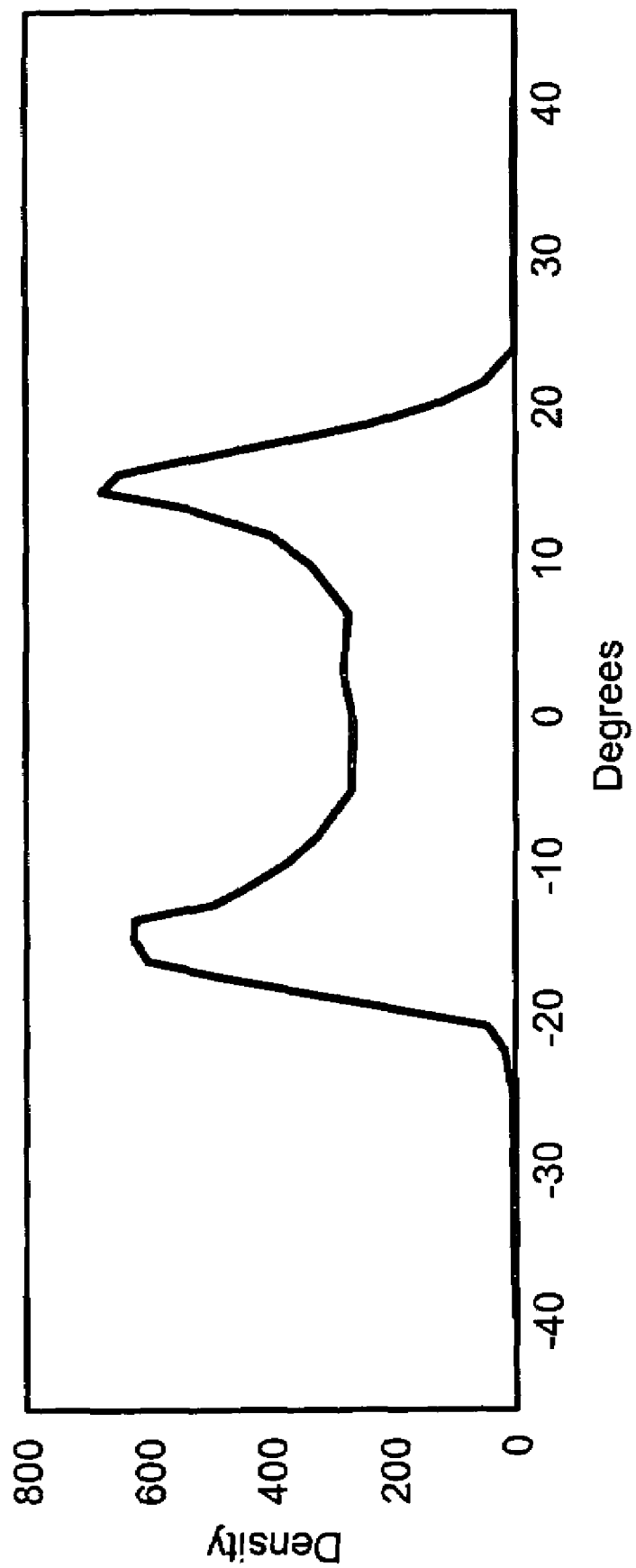

FIGS. 7A-7C are diagrams illustrating a non-coherent relationship between a lower transmission layer over the upper transmission layer after upper layer demodulation. FIG. 7A shows the constellation 700 before the first CRL of the upper layer. The lower-layer constellation rings 702 rotate around the large radius circle indicated by the dashed line. FIG. 7B shows the constellation 704 after CRL of the upper layer where the rotation of the constellation rings 702 is stopped. The constellation rings 702 are the signal points of the lower layer around the nodes 602 of the upper layer. FIG. 7C depicts a phase distribution of the received signal with respect to nodes 602.

Relative modulating frequencies of the non-coherent upper and lower layer signals cause the lower layer constellation to rotate around the nodes 602 of the upper layer constellation to form rings 702. After the lower layer CRL this rotation is eliminated and the nodes of the lower layer are revealed (as shown in FIG. 6B). The radius of the lower layer constellation rings 702 is indicative of the lower layer power level. The thickness of the rings 702 is indicative of the CNR of the lower layer. As the two layers are non-coherent, the lower layer may be used to transmit distinct digital or analog signals.

Figure 8A:
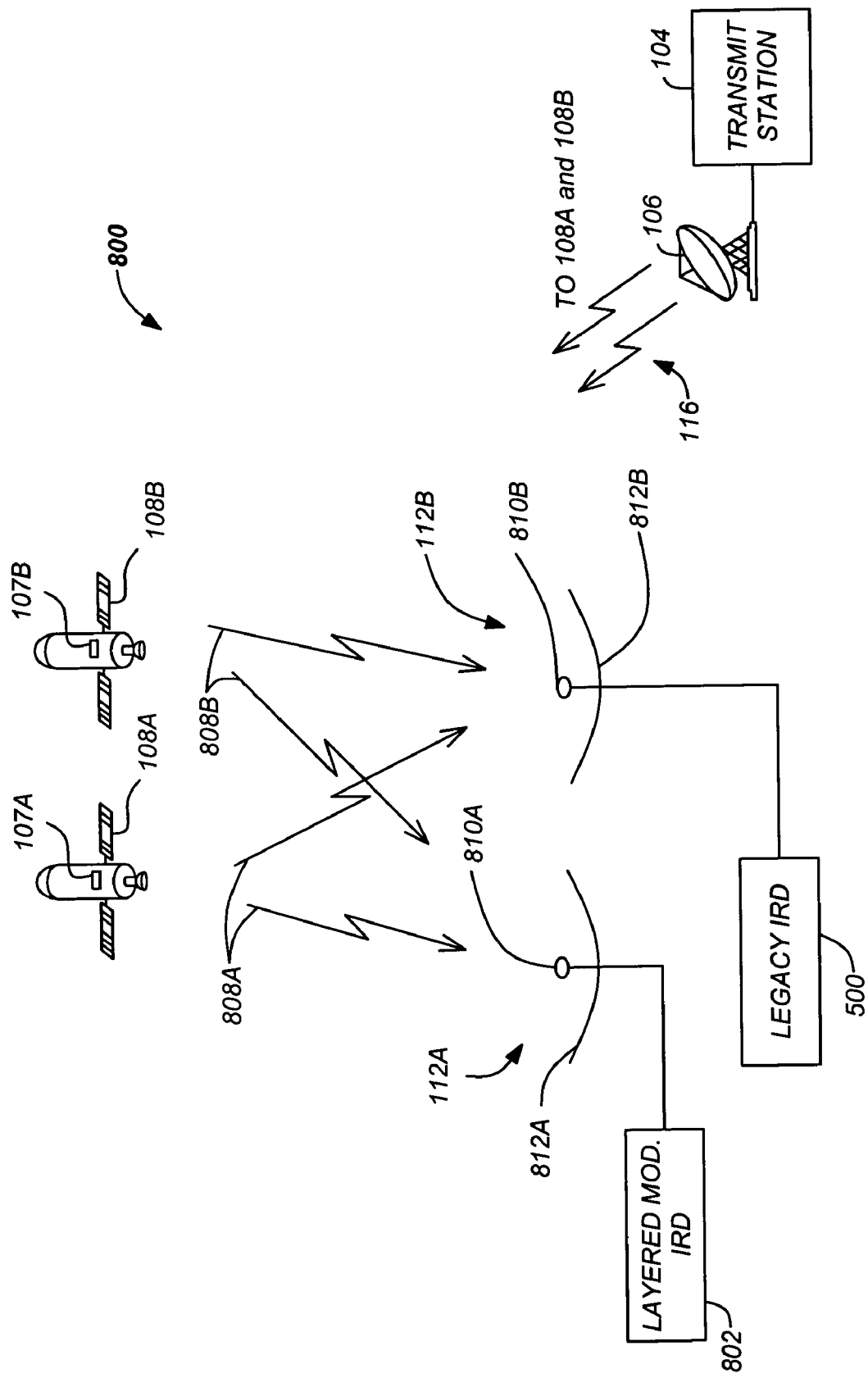
FIG. 8A is a diagram showing a system for transmitting and receiving layered modulation signals.

FIG. 8A is a diagram showing a system for transmitting and receiving layered modulation signals. Separate transponders 107A, 107B (which include TWTAs to amplify the signals), as may be located on any suitable platform, such as satellites 108A, 108B, or co-located on a single platform such as satellite 108A, are used to non-coherently transmit different layers of a signal of the present invention. One or more feeder link signals 116 are typically transmitted to each satellite 108A, 108B from one or more uplink centers 104 via an antenna 106

Figure 8B:
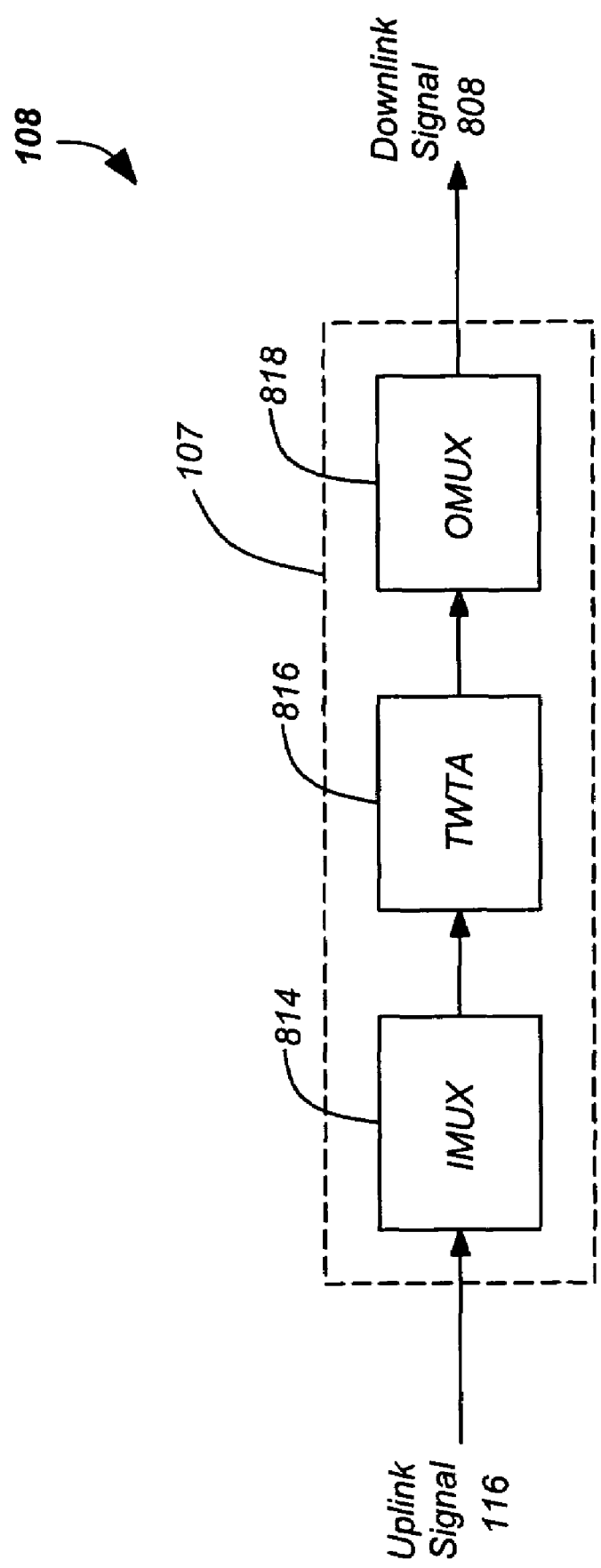
FIG. 8B is a diagram showing an exemplary satellite transponder for receiving and transmitting a component of a layered modulation signal.

FIG. 8B is a diagram illustrating an exemplary satellite transponder 107 for receiving and transmitting layered modulation signals on a satellite 108. The feeder link signal 116 is received by the satellite 108 and passed through an input multiplexer (IMUX) 814. Following this the signal is amplified with one or more TWTAs 816 and then through an output multiplexor (OMUX) 818 before the downlink signal 808 is transmitted to the receivers 802, 500. As is known in the art, the TWTA 816 block can be multiple TWTAs in a power combiner, particularly in the case of the upper layer signal to meet its high power requirements.

The layered signals 808A, 808B (e.g. multiple downlink signals 118) are received at receiver antennas 812A, 812B, such as satellite dishes, each with an LNB 810A, 810B where they are then coupled to IRDs 500, 802. For example, first satellite 108A and transponder 107A can transmit an upper layer legacy signal 808A and second satellite 108B and transponder 107B can transmit a lower layer signal 808B. Although both signals 808A, 808B arrive at each antenna 812A, 812B and LNB 810A, 810B, only the layer modulation IRD 802 is capable of decoding both signals 808A, 808B. The legacy receiver 500 is only capable of decoding the upper layer legacy signal 808A; the lower layer signal 808B appears only as noise to the legacy receiver 500.

Because the signal layers can be transmitted non-coherently, separate transmission layers may be added at any time using different satellites 108A, 108B or other suitable platforms, such as ground-based or high altitude platforms. Thus, any composite signal, including new additional signal layers will be backwards compatible with legacy receivers 500, which will disregard the new signal layers. To ensure that the signals do not interfere, the combined signal and noise level from the lower layer must be at or below the allowed noise floor for the upper layer at the particular receiver antenna 812A, 812B.

Layered modulation applications include backwards compatible and non-backwards compatible applications. "Backwards compatible" in this sense, describes systems in which legacy receivers 500 are not rendered obsolete by the additional signal layer(s). Instead, even though the legacy receivers 500 are incapable of decoding the additional signal layer(s), they are capable of receiving the layered modulated signal and decoding the original signal layer. In these applications, the pre-existing system architecture is accommodated by the architecture of the additional signal layers. "Non-backwards compatible" describes a system architecture which makes use of layered modulation, but the modulation scheme employed is such that pre-existing equipment is incapable of receiving and decoding the information on additional signal layer(s).

The pre-existing legacy IRDs 500 decode and make use of data only from the layer (or layers) they were designed to receive, unaffected by the additional layers. However, as will be described hereafter, the legacy signals may be modified to optimally implement the new layers. The present invention may be applied to existing direct satellite services which are broadcast to individual users in order to enable additional features and services with new receivers without adversely affecting legacy receivers and without requiring additional signal frequency.

2.5 Demodulator and Decoder

Figure 9:
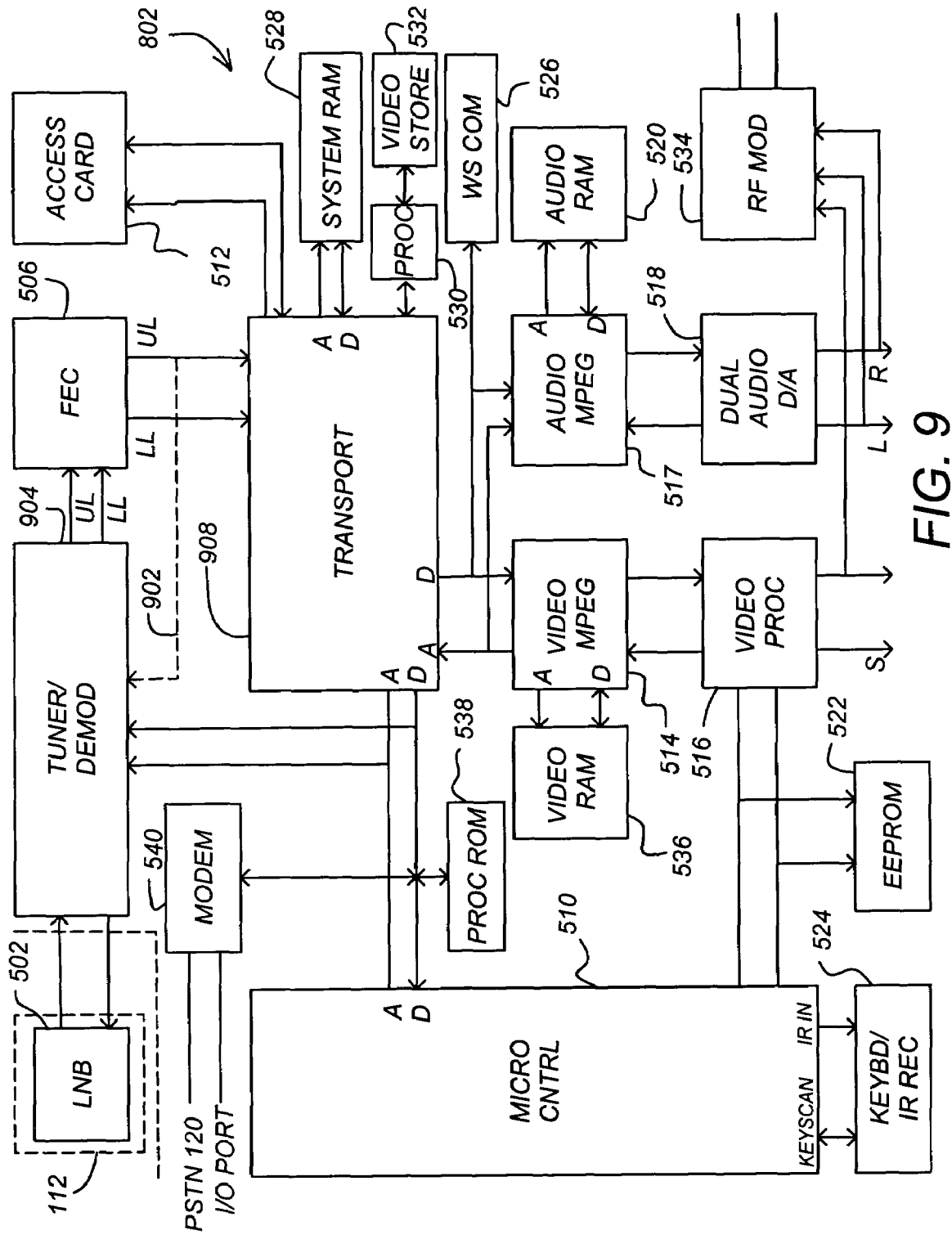
FIG. 9 is a block diagram depicting one embodiment of an enhanced IRD capable of receiving layered modulation signals.

FIG. 9 is a block diagram depicting one embodiment of an enhanced IRD 802 capable of receiving layered modulation signals. The IRD includes many similar components as that of the legacy IRD 500 of FIG. 5. However, the enhanced IRD 802 includes a feedback path 902 in which the FEC decoded symbols are fed back to a enhanced modified tuner/demodulator 904 and transport module 908 for decoding both signal layers as detailed hereafter.

Figure 10A:
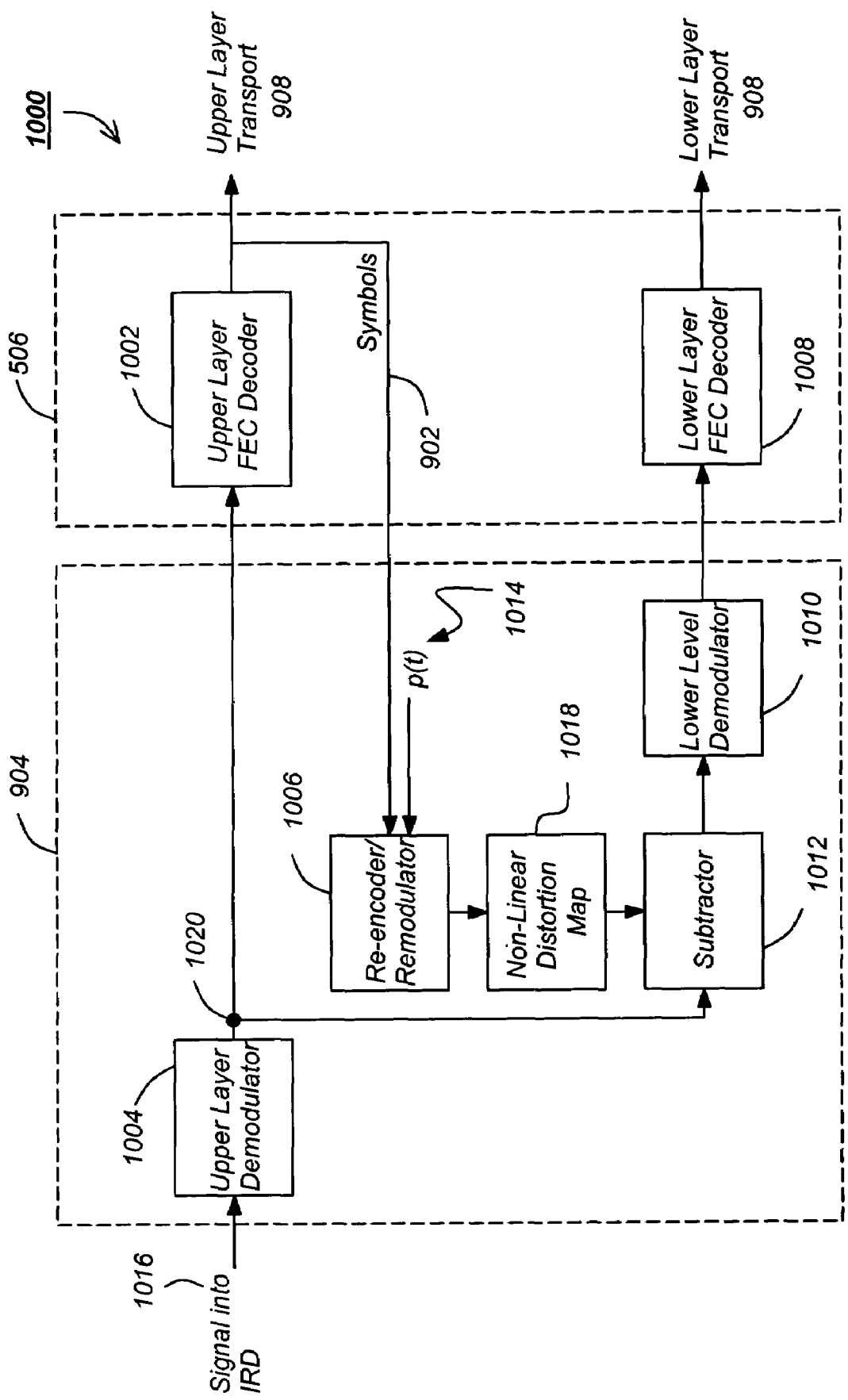
FIG. 10A is a block diagram of one embodiment of the enhanced tuner/demodulator and FEC decoder.

FIG. 10A is a block diagram of one embodiment of the enhanced tuner and demodulator/re-modulator 904 and FEC decoder/re-encoder 506. FIG. 10A depicts reception where layer subtraction is performed on a signal where the upper layer carrier has already been demodulated. The upper layer of the received combined signal 1016 from the LNB 502, which may contain legacy modulation format, is provided to and processed by an upper layer demodulator 1004 to produce the stable demodulated signal 1020. The demodulated signal 1020 is communicatively coupled to a FEC decoder 1002 which decodes the upper layer to produce the upper layer symbols which are output to an upper layer transport module 908. The upper layer symbols are also used to generate an idealized upper layer signal. The upper layer symbols may be produced from the decoder 1002 after Viterbi decode (BER<$10^{-3}$ or so) or after Reed-Solomon (RS) decode (BER<$10^{-9}$ or so), in typical decoding operations known to those skilled in the art. The upper layer symbols are provided via feedback path 902 from the upper layer decoder 1002 to a re-encoder/re-modulator 1006 which effectively produces an idealized upper layer signal. The idealized upper level signal is subtracted from the demodulated upper layer signal 1020.

In order for the subtraction to yield a suitable lower layer signal, the upper layer signal must be precisely reproduced. The modulated signal may have been distorted, for example, by TWTA non-linearity or other non-linear or linear distortions in the transmission channel. The distortion effects are estimated from the received signal after the fact or from TWTA characteristics which may be downloaded into the IRD in AM-AM and AM-PM maps 1014, used to eliminate the distortion using non-linear distortion map module 1018.

A subtractor 1012 then subtracts the idealized upper layer signal from the stable demodulated signal 1020. This leaves the lower-power second layer signal. The subtractor 1012 may include a buffer or delay function to retain the stable demodulated signal 1020 while the idealized upper layer signal is being constructed. The second layer signal is demodulated by the lower level demodulator 1010 and FEC decoded by decoder 1008 according to its signal format to produce the lower layer symbols, which are provided to the transport module 908.

Figure 10B:
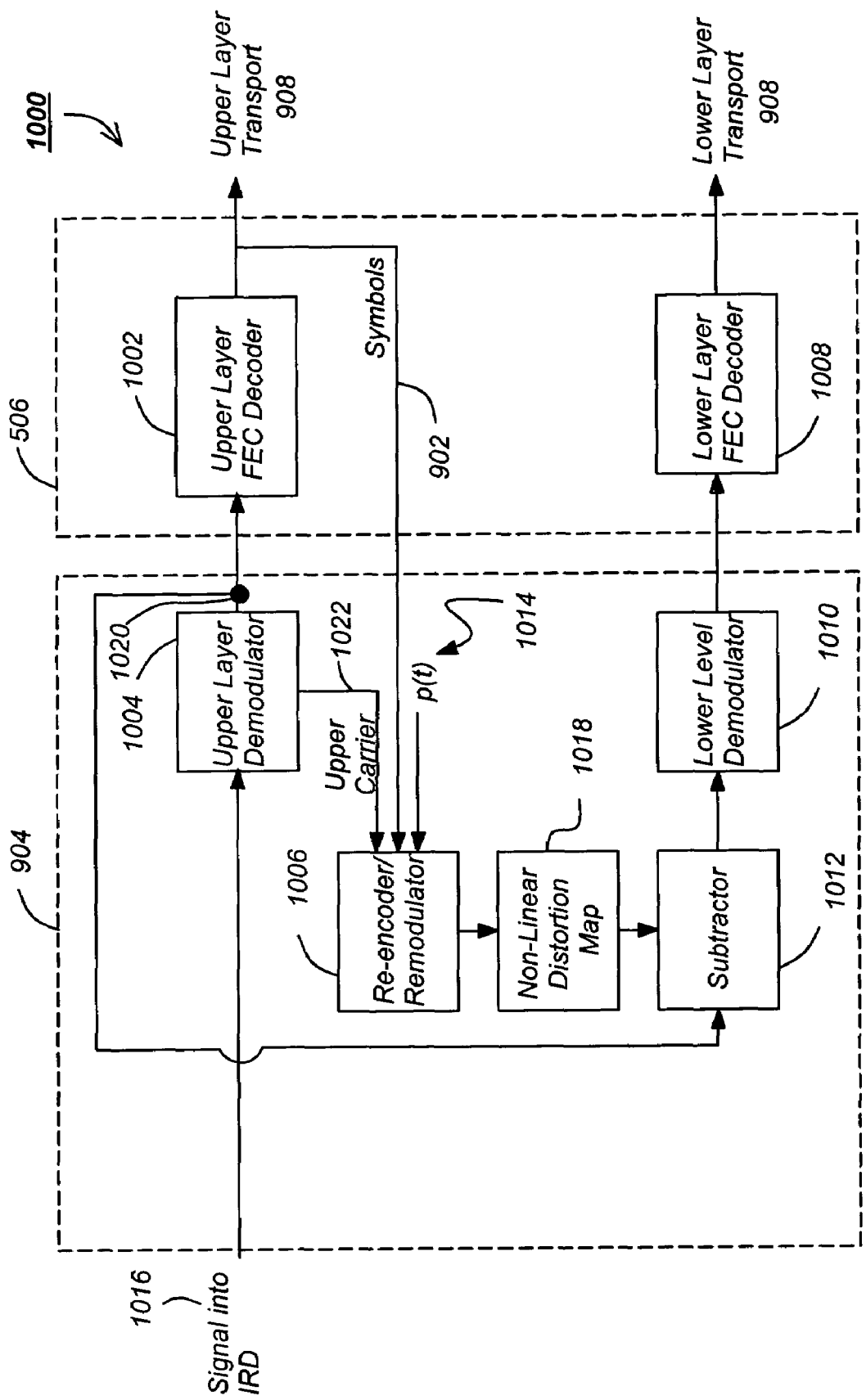
FIG. 10B depicts another embodiment of the enhanced tuner/demodulator wherein layer subtraction is performed on the received layered signal.

FIG. 10B depicts another embodiment wherein layer subtraction is performed on the received layered signal (prior to upper layer demodulation). In this case, the upper layer demodulator 1004 produces the upper carrier signal 1022 (as well as the stable demodulated signal output 1020). An upper carrier signal 1022 is provided to the re-encoder/remodulator 1006. The re-encoder/remodulator 1006 provides the re-encoded and remodulated signal to the non-linear distortion mapper 1018 which effectively produces an idealized upper layer signal. Unlike the embodiment shown in FIG. 10A, in this embodiment the idealized upper layer signal includes the upper layer carrier for subtraction from the received combined signal 808A, 808B.

Other equivalent methods of layer subtraction will occur to those skilled in the art and the present invention should not be limited to the examples provided here. Furthermore, those skilled in the art will understand that the present invention is not limited to two layers; additional layers may be included. Idealized upper layers are produced through remodulation from their respective layer symbols and subtracted. Subtraction may be performed on either the received combined signal or a demodulated signal. Finally, it is not necessary for all signal layers to be digital transmissions; the lowest layer may be an analog transmission.

The following analysis describes the exemplary two layer demodulation and decoding. It will be apparent to those skilled in the art that additional layers may be demodulated and decoded in a similar manner. The incoming combined signal is represented as:

$$s_{UL}(t) = f_U\left(M_U\exp(j\omega_U t + \theta_U)\sum_{m=-\infty}^{\infty} S_{Um}p(t-mT)\right) + f_L\left(M_L\exp(j\omega_L t + \theta_L)\sum_{m=-\infty}^{\infty} S_{Lm}p(t-mT+\Delta T_m)\right) + n(t)$$

where, $M_U$ is the magnitude of the upper layer QPSK signal and $M_L$ is the magnitude of the lower layer QPSK signal and $M_L \ll M_U$. The signal frequencies and phase for the upper and lower layer signals are respectively $\omega_U$, $\theta_U$ and $\omega_L, \theta_L$. The symbol timing misalignment between the upper and lower layers is $\Delta T_m$. p(t−mT) represents the time shifted version of the pulse shaping filter p(t) 414 employed in signal modulation. QPSK symbols $S_{Um}$ and $S_{Lm}$ are elements of $$\left\{\exp\left(j\frac{n\pi}{2}\right), n = 0, 1, 2, 3\right\} \cdot f_U(\cdot)$$

and $f_L(\cdot)$ denote the distortion function of the TWTAs for the respective signals.

Ignoring $f_U(\cdot)$ and $f_L(\cdot)$ and noise n(t), the following represents the output of the demodulator 1004 to the FEC decoder 1002 after removing the upper carrier:

$$s'_{UL}(t) = M_U\sum_{m=-\infty}^{\infty} S_{Um}p(t-mT) + M_L\exp\{j(\omega_L-\omega_U)t + \theta_L - \theta_U\}\sum_{m=-\infty}^{\infty} S_{Lm}p(t-mT+\Delta T_m)$$

Because of the magnitude difference between $M_U$ and $M_L$, the upper layer decoder 402 disregards the $M_L$ component of the $s'_{UL}(t)$.

After subtracting the upper layer from $s_{UL}(t)$ in the subtractor 1012, the following remains:

$$s_L(t) = M_L\exp\{j(\omega_L-\omega_U)t+\theta_L-\theta_U\}\sum_{m=-\infty}^{\infty} S_{Lm}p(t-mT+\Delta T_m)$$

Any distortion effects, such as TWTA nonlinearity effects are estimated for signal subtraction. In a typical embodiment of the present invention, the upper and lower layer frequencies are substantially equal. Significant improvements in system efficiency can be obtained by using a frequency offset between layers.

Using the present invention, two-layered backward compatible modulation with QPSK doubles a current ⅚ rate capacity by adding a TWTA approximately 6.2 dB above an existing TWTA power. New QPSK signals may be transmitted from a separate transmitter, from a different satellite for example. In addition, there is no need for linear TWTAs as with 16QAM, as any TWTA nonlinearity may be included in the reconstructed signal for cancellation in the subtractor. Also, no phase error penalty is imposed on higher order modulations such as 8PSK and 16QAM.

3.0 Power Levels of Modulation Layers

In a layered modulation system, the relationship between the individual modulation layers can be structured to facilitate backward compatible applications. Alternately, a new layer structure can be designed to optimize the combined efficiency and/or performance of the layered modulation system.

3.1 Backward Compatible Applications

Figure 11A:
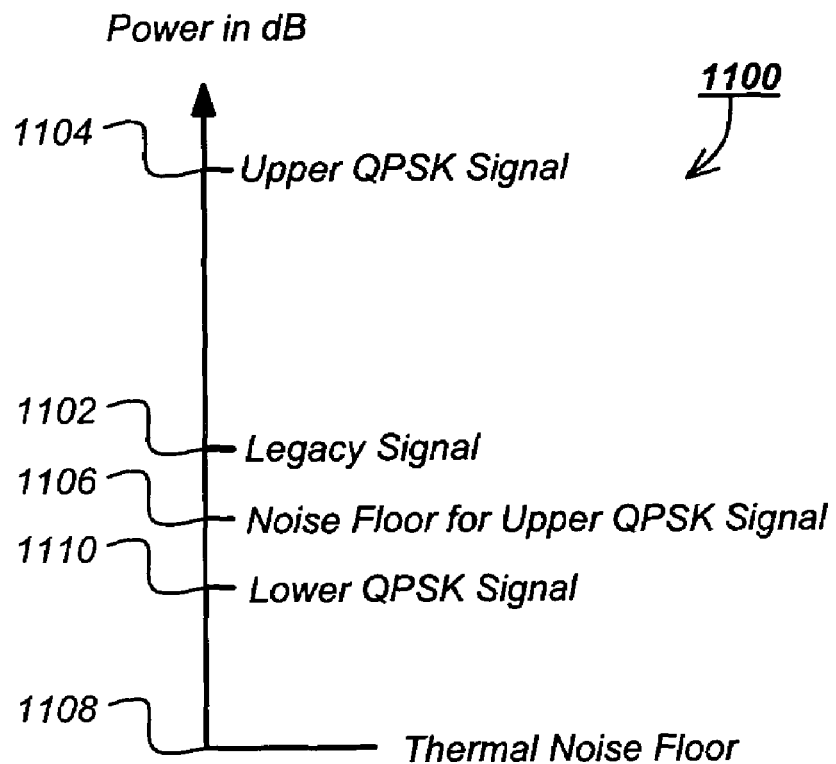
FIGS. 11A and 11B depict the relative power levels of example embodiments of the present invention.

FIG. 11A depicts the relative power levels 1100 of example embodiments of the present invention without taking into account the effects of rain. Accommodation of rain fade effects comes through the inclusion of clear sky margin in the calculation of transmit power levels. FIG. 11A is not a scale drawing. This embodiment doubles the pre-existing rate ⅚ capacity by using a TWTA whose power level is 6.2 dB above a pre-existing (legacy) TWTA, and a second TWTA whose power level is 2 dB below that of a pre-existing (legacy) TWTA. This embodiment uses upper and lower QPSK layers which are non-coherent. An FEC code rate of ⅚ is also used for both layers. In this embodiment, the signal of the legacy QPSK signal 1102 is used to generate the upper layer 1104 and a new QPSK layer is the lower layer 1110. The legacy QPSK signal 1102 has a threshold CNR (i.e., the CNR required to achieve acceptable performance) of approximately 7 dB. The new lower QPSK layer 1110 has a threshold CNR of approximately 5 dB. In the present invention, then, the lower QPSK layer transmit power level 1110 is first set so that the received lower layer power is 5 dB above the reference thermal noise power level 1108. Both the thermal noise and the lower layer signal will appear as noise to the upper layer legacy QPSK signal, and this combined noise power must be taken into account when setting the upper layer transmit power level. The combined power of these two noise sources 1106 is 6.2 dB above the reference thermal noise floor 1108. The legacy QPSK signal must then be boosted in power by approximately 6.2 dB above the legacy signal power level 1102 bringing the new power level to approximately 13.2 dB as the upper layer 1104. In this way the combined lower layer signal power and thermal noise power is kept at or below the tolerable noise floor 1106 of the upper layer. It should be noted that the invention may be extended to multiple layers with mixed modulations, coding and code rates.

In an alternate embodiment of this backwards compatible application, an FEC code rate of ⅔ may be used for both the upper and lower layers 1104, 1110. In this case, the threshold CNR of the legacy QPSK signal 1102 (with an FEC code rate of ⅔) is approximately 5.8 dB. The legacy signal 1102 is boosted by approximately 5.3 dB to approximately 11.1 dB (4.1 dB above the legacy QPSK signal 1102 with an FEC code rate of ⅔) to form the upper QPSK layer 1104. The new lower QPSK layer 1110 has a threshold CNR of approximately 3.8 dB. The total signal and noise of the lower layer 1110 is kept at or below approximately 5.3 dB, the tolerable noise floor 1106 of the upper QPSK layer. In this case, the total capacity is 1.55 times that the legacy signal 1102.

In a further embodiment of a backwards compatible application of the present invention the code rates between the upper and lower layers 1104, 1110 may be mixed. For example, the legacy QPSK signal 502 may be boosted by approximately 5.3 dB to approximately 12.3 dB with the FEC code rate unchanged at ⅚ to create the upper QPSK layer 1104. The new lower QPSK layer 1110 may use an FEC code rate of ⅔ with a threshold CNR of approximately 3.8 dB. In this case, the total capacity is 1.78 times that of the legacy signal 1102.

3.2 Non-Backward Compatible Applications

As previously discussed the present invention may also be used in "non-backward compatible" applications. In a first example embodiment, two QPSK layers 1104, 1110 are used each at a code rate of ⅔. The upper QPSK layer 504 has a CNR of approximately 4.1 dB above its noise floor 1106 and the lower QPSK layer 1110 also has a CNR of approximately 4.1 dB. The total code and noise level of the lower QPSK layer 1110 is approximately 5.5 dB. The total CNR for the upper QPSK signal 1104 is approximately 9.4 dB, merely 2.4 dB above the legacy QPSK signal rate ⅚. The capacity is approximately 1.74 compared to the legacy rate ⅚.

Figure 11B:
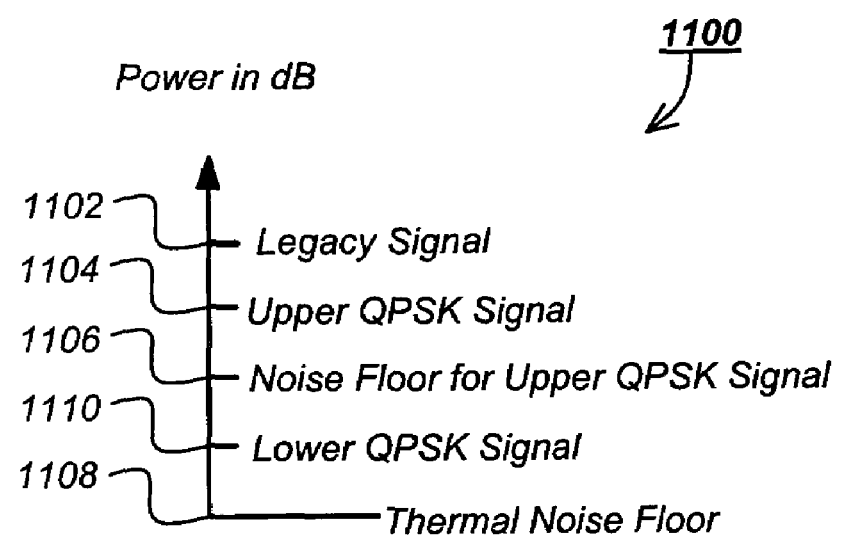

FIG. 11B depicts the relative power levels of an alternate embodiment wherein both the upper and lower layers 1104, 1110 are below the legacy signal level 1102. The two QPSK layers 1104, 1110 use a code rate of ½. In this example, the upper QPSK layer 1104 is approximately 2.0 dB above its noise floor 1106 of approximately 4.1 dB. The lower QPSK layer has a CNR of approximately 2.0 dB and a total code and noise level at or below 4.1 dB. The capacity of this embodiment is approximately 1.31 compared to the legacy rate ⅚.

4. Hardware Environment

Figure 12:
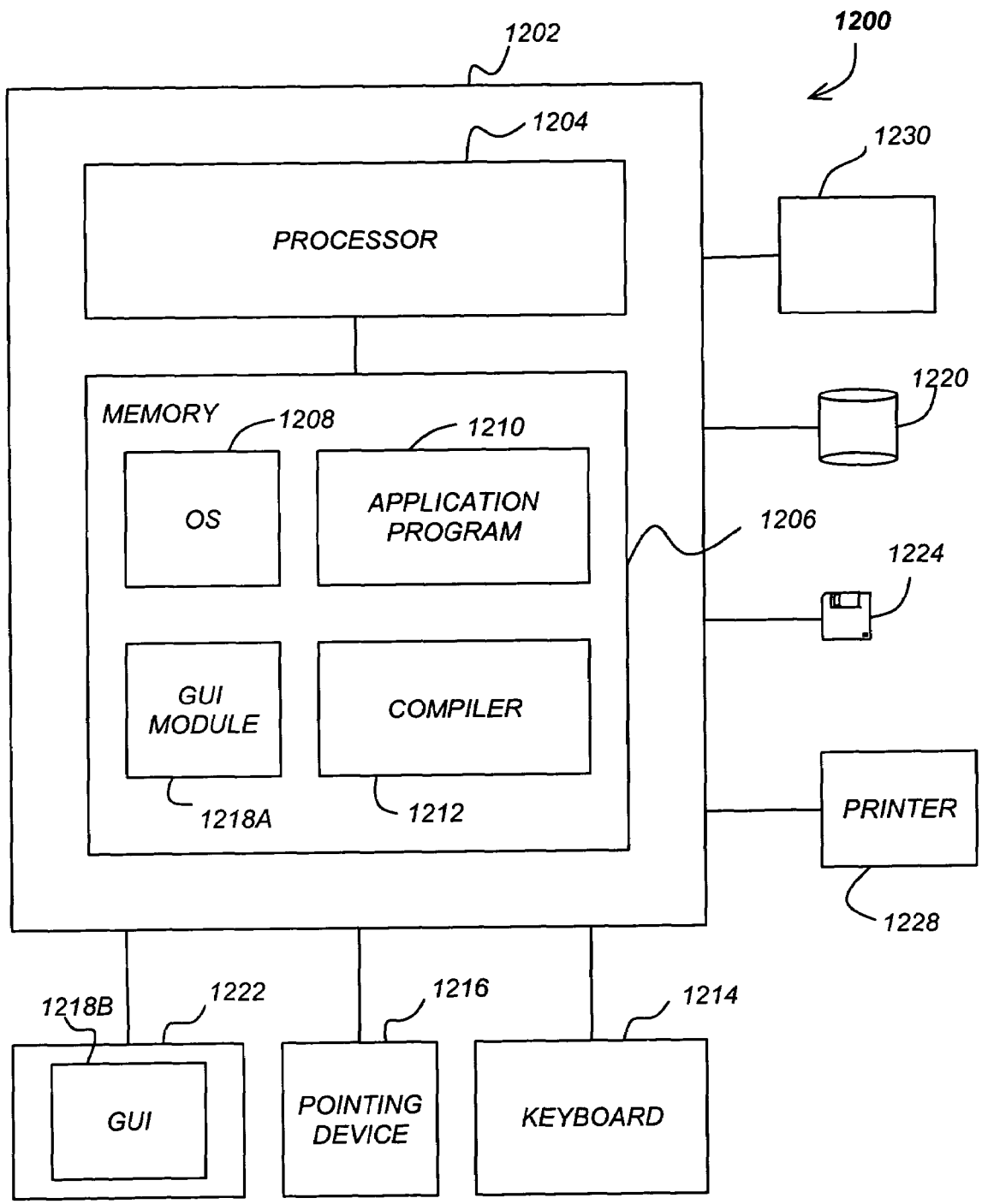
FIG. 12 illustrates an exemplary computer system that could be used to implement selected modules or functions the present invention.

FIG. 12 illustrates an exemplary computer system 1200 that could be used to implement selected modules and/or functions of the present invention. The computer 1202 comprises a processor 1204 and a memory 1206, such as random access memory (RAM). The computer 1202 is operatively coupled to a display 1222, which presents images such as windows to the user on a graphical user interface 1218B. The computer 1202 may be coupled to other devices, such as a keyboard 1214, a mouse device 1216, a printer 1228, etc. Of course, those skilled in the art will recognize that any combination of the above components, or any number of different components, peripherals, and other devices, may be used with the computer 1202.

Generally, the computer 1202 operates under control of an operating system 1208 stored in the memory 1206, and interfaces with the user to accept inputs and commands and to present results through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors. The computer 1202 also implements a compiler 1212 which allows an application program 1210 written in a programming language such as COBOL, C++, FORTRAN, or other language to be translated into processor 1204 readable code. After completion, the application 1210 accesses and manipulates data stored in the memory 1206 of the computer 1202 using the relationships and logic that was generated using the compiler 1212. The computer 1202 also optionally comprises an external communication device such as a modem, satellite link, Ethernet card, or other device for communicating with other computers.

In one embodiment, instructions implementing the operating system 1208, the computer program 1210, and the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, etc. Further, the operating system 1208 and the computer program 1210 are comprised of instructions which, when read and executed by the computer 1202, causes the computer 1202 to perform the steps necessary to implement and/or use the present invention. Computer program 1210 and/or operating instructions may also be tangibly embodied in memory 1206 and/or data communications devices 1230, thereby making a computer program product or article of manufacture according to the invention. As such, the terms "article of manufacture", "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

5. CNR Measurement

The present invention provides for the measurement of CNR and signal compensation for tracked carrier phase and phase modulation in a CONUS satellite signal distribution. An exemplary embodiment of the invention provides a measurement of the CNR of a received signal by processing the output from the carrier recovery loop, generating schematic representations of the signal nodes, wherein the CNR measures the points of disparity ("fuzziness") surrounding the signal nodes and comparing the value of the input signal CNR to a predetermined degradation by impairments.

An alternative embodiment of the present invention may be applied to spot beam satellites such as the DIRECTV D4S satellite wherein the CNR and carrier-to-interference ratio (CIR) are both monitored at output points during demodulation and compared to a look up table of values corrected for BER.

CNR measurement of a received signal can take place at several possible points in the demodulation process. For example, the measurement can occur at the output of the CRL, the output of the timing recovery loop (TRL) or the output of the analog-to-digital (A/D) converter. A table look up can be used to apply compensation for uncoded symbol errors. The required compensation is negligible at high CNRs. The look up tables can be generated using Monte Carlo simulations and separate look up tables can be applied for the outputs of the tracking recovery loop and the carrier recovery loop and for different modulations such as QPSK and 8PSK. Embodiments of the invention can produce very accurate results with the perceived CNR at various points during the demodulation process. This dictates the bit error ratio (BER) and is accurate event with added inter-modulation from the TWTA non-linearity.

In each of the techniques for measuring the CNR of a received signal detailed hereafter, the processes can be performed as part of the tuning and demodulation functions of the tuner/demodulator 904 of FIG. 9. For example, the CNR measurement can be performed by the upper layer demodulator 1004 shown in FIG. 10A or 10B.

5.1 CNR Measurement at Carrier Recovery Loop Output

The CNR measurement can be made at the output of the carrier recovery loop. The signal is further compensated for the tracked carrier and phase modulation. The real signal produces points which deviate from the ideal signal node. In a two-dimensional "scatterer-frame", these points appear as "fuzziness" around each of the signal nodes. The CNR measurement is essentially a measurement of the size of the apparent "fuzziness" around the signal nodes. Processing from the carrier recovery loop output to measure the CNR can produce a very accurate measurement (e.g. on the order of 0.1 dB at a CNR of approximately 7 dB). This is particularly true if the constellation is constructed after layered modulation processing subtracts the received signal from the decoded nodes, resulting in virtually no uncoded symbol errors. The measurement takes into account all impairments right before the signal is FEC decoded.

Figure 13A:
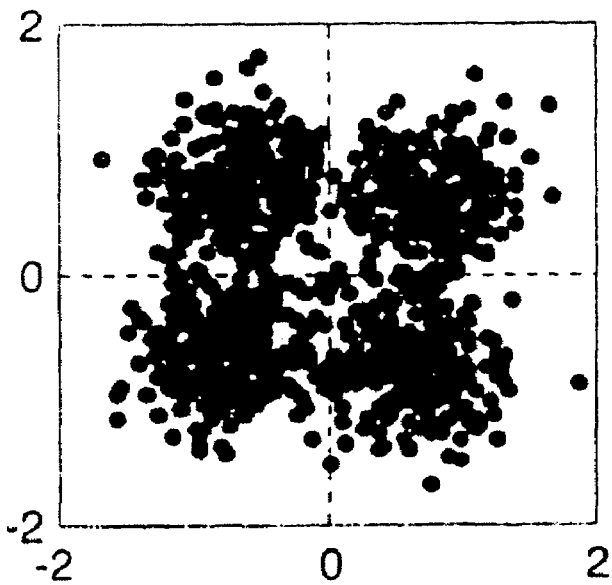
FIGS. 13A and 13B illustrate a simulated CNR measurement at the carrier recovery loop output.
Figure 13B:
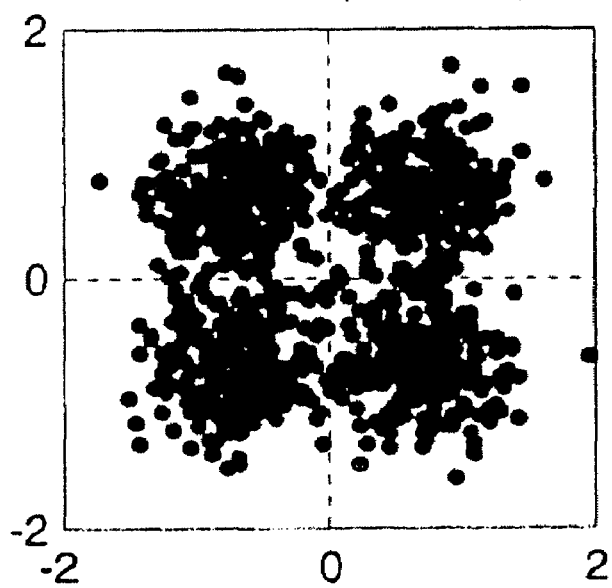

FIGS. 13A and 13B illustrate simulated samples for a QPSK signal at the carrier recovery loop output for CNR measurement. FIG. 13A illustrates the signal constellation before the carrier recovery loop. FIG. 13B illustrates the signal constellation after a very small carrier frequency is removed by the carrier recovery loop. The simulated CNR measurement data is taken from an emulated TWTA for a transponder.

Figure 14:
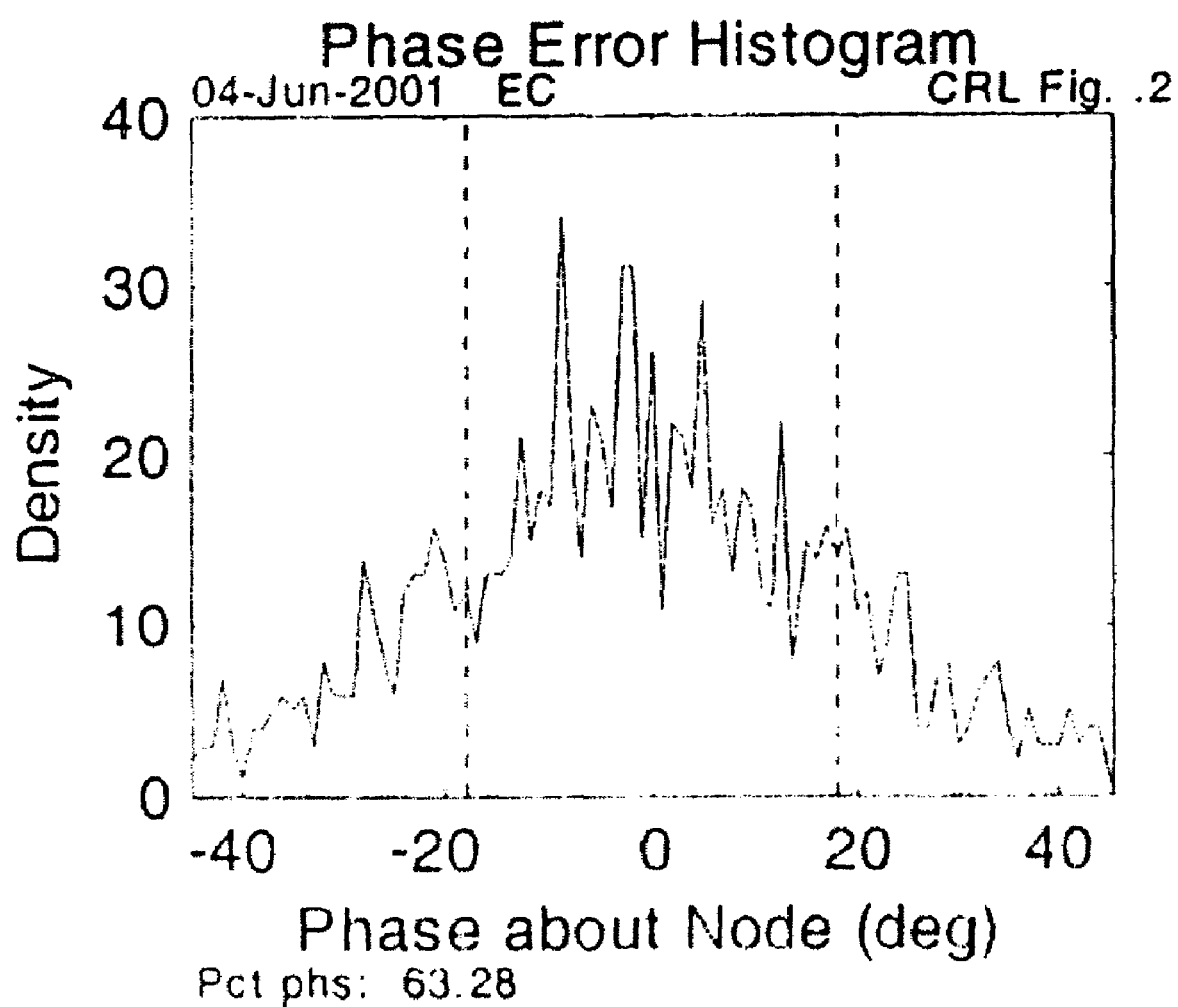
FIG. 14 illustrates a phase error histogram for the simulated CNR measurement at the carrier recovery loop output.

FIG. 14 illustrates a phase error histogram for the simulated CNR measurement at the carrier recovery loop output. In this case, the CNR measurement is based on the tightness of the grouping of the node clusters with uncoded error symbols. The measured signal CNR can be corrected for the error symbols. The input CNR is 7 dB before TWTA nonlinearity in this example.

Figure 15A:
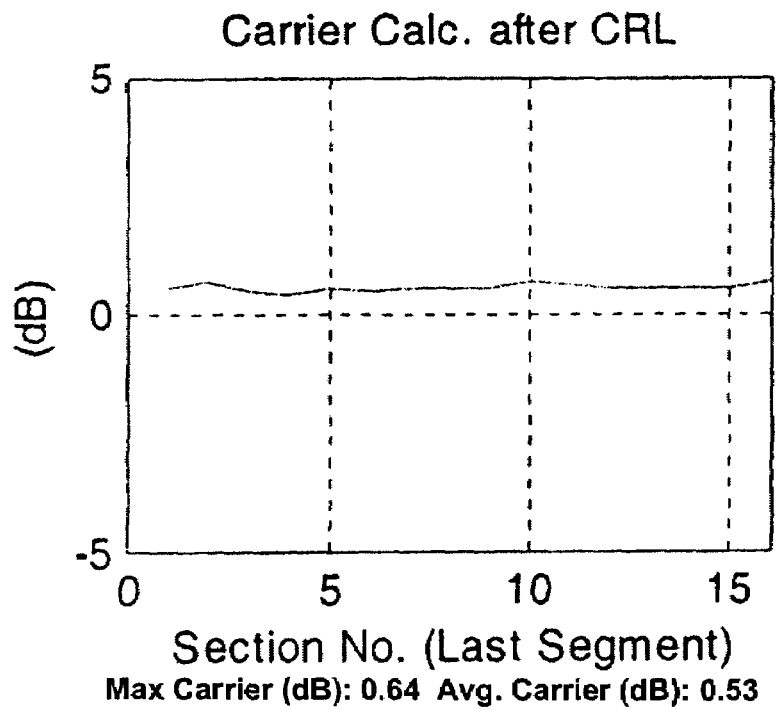
FIGS. 15A and 15B illustrate the carrier and noise calculations, respectively, of the simulated CNR measurement after the carrier recovery loop.
Figure 15B:
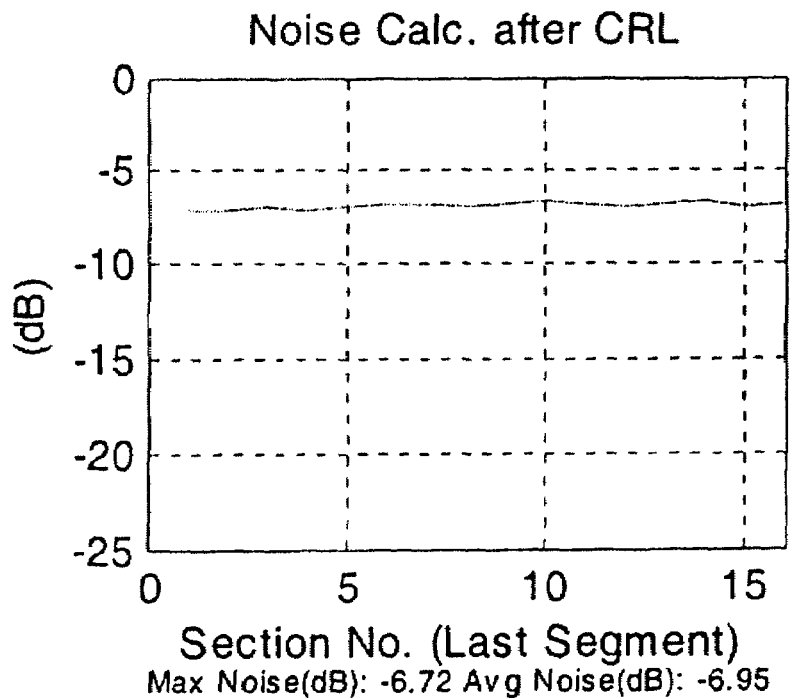

FIGS. 15A and 15B illustrate the carrier and noise calculations, respectively, of the simulated CNR measurement after the carrier recovery loop. The carrier signal power is calculated from the centers of the clusters in the four quadrants. The noise power is calculated from the mean-square of the samples around the estimated signal nodes.

Figure 15C:
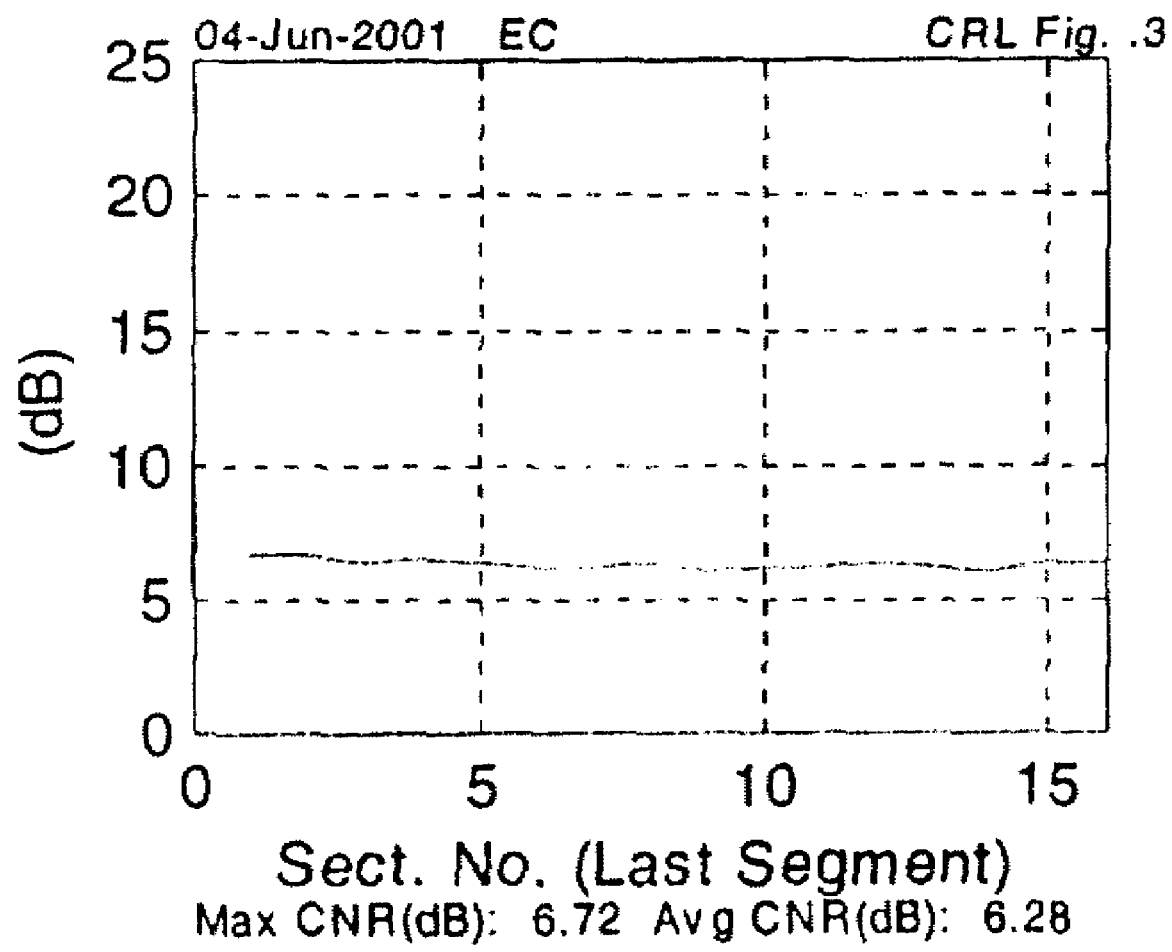
FIG. 15C illustrates the measured CNR from the carrier and noise calculations of FIGS. 15A and 15B.

FIG. 15C illustrates the measured CNR from the carrier and noise calculations of FIGS. 15A and 15B. The measured CNR is approximately 6.4 dB. The CNR degradation of 0.6 dB is mostly due to the TWTA non-linearity included in the simulated data.

Figure 16:
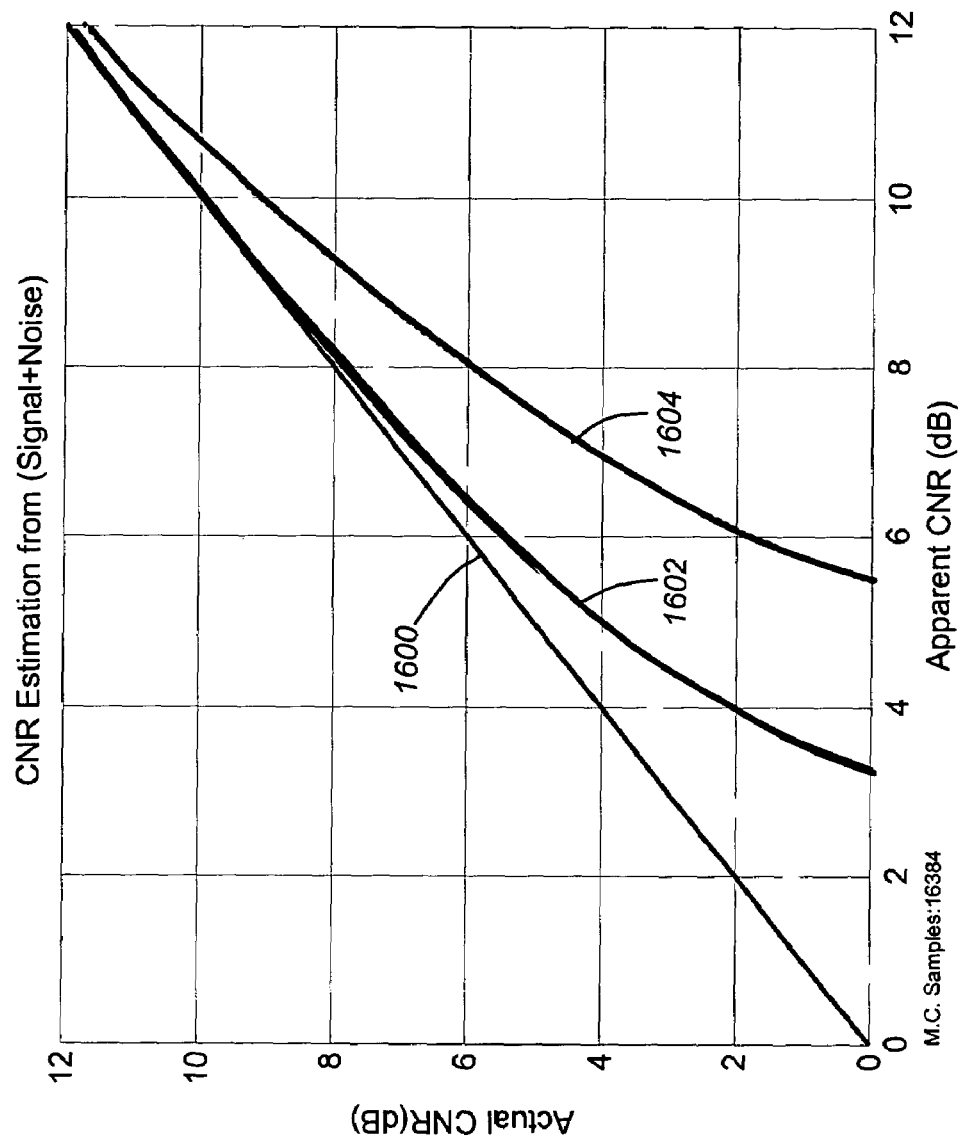
FIG. 16 illustrates the measured CNR at the carrier recovery loop compared with the actual CNR.

FIG. 16 illustrates the actual CNR at the carrier recovery loop compared with the apparent (measured) CNR for QPSK and 8PSK signals. If there were no error symbols, the actual CNR would be the same as the apparent CNR as indicated by the straight line 1600. Corrected curves for the CNR estimates 1602 and 1604 are based upon the signal format; line 1602 estimates an QPSK signal and line 1604 estimates a 8PSK signal. The CNR estimate lines 1602 and 1604 are biased from the actual CNR due to uncoded error symbols. Since the 8PSK signal has more uncoded error symbols than the QPSK signals, it needs a greater correction curve than the QPSK signal. However, in each case the biases decrease with increasing CNR. Using the above example, the corrected CNR value for the apparent CNR value of 6.8 dB for the QPSK signal is 6.4 dB, as mentioned above.

Figure 17:
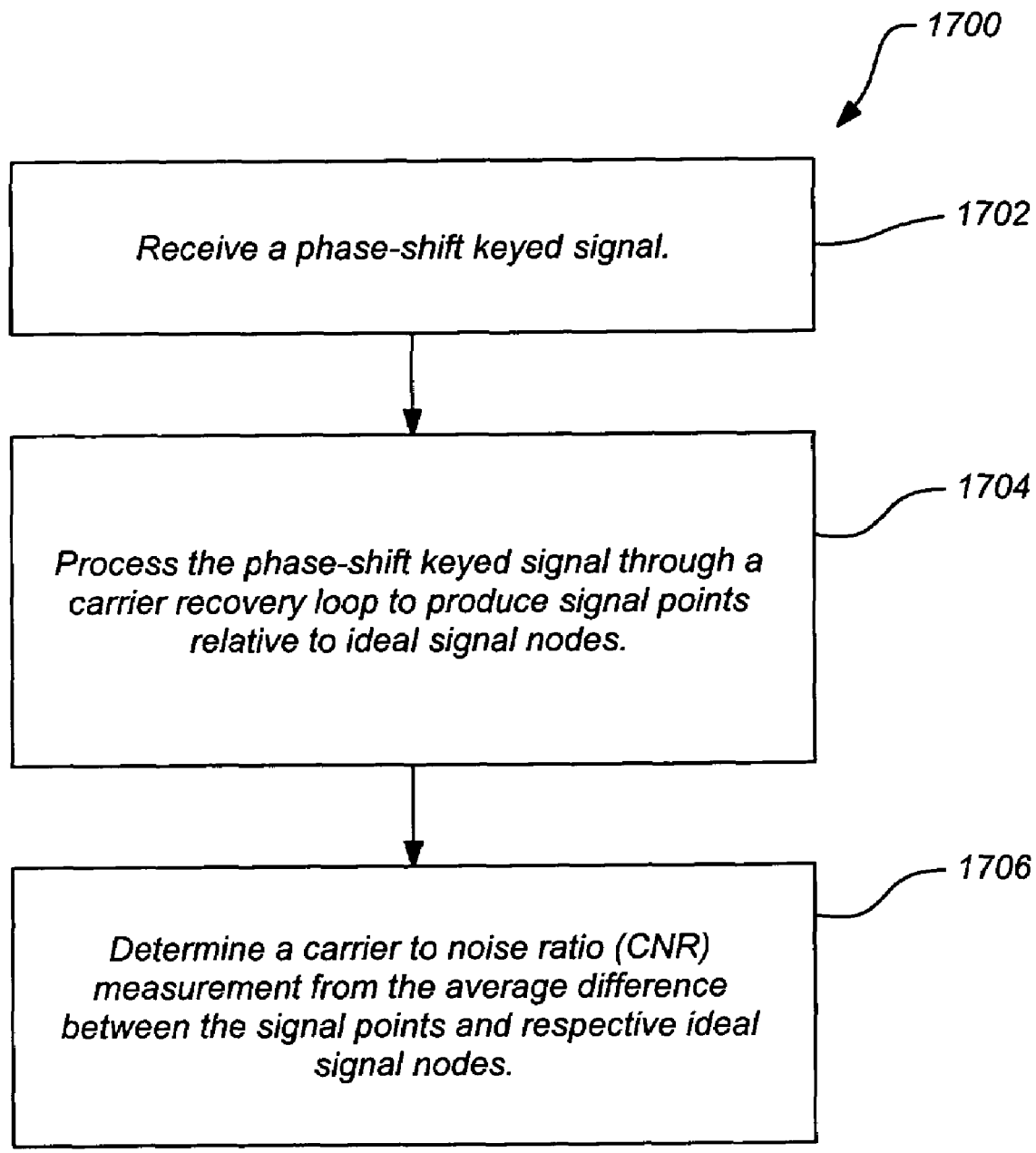
FIG. 17 is a flowchart of an exemplary method for measuring the CNR of a received signal at the output of the carrier recovery loop.

FIG. 17 is a flowchart of an exemplary method for measuring the CNR of a received signal at an output of a carrier recovery loop in the tuner/demodulator 904. The method 1700 begins at step 1702 by receiving a phase-shift keyed signal. Next at step 1704 the phase-shift keyed signal is processed through a carrier recovery loop to produce signal points relative to ideal signal nodes. Finally at step 1706, a CNR measurement is determined from the average difference between the signal points and respective ideal signal nodes; an ideal signal node is calculated from the mean of all data samples signals that falls within the decision boundaries of the node. Because of uncoded symbol errors, this would bias the CNR measurement. Bias of the CNR measurement can be reduced based upon a predicted systematic characteristic. For example, a bias value from a look-up table based upon the CNR measurement can be subtracted from the CNR measurement. Alternatively, the phase-shift keyed signal can be corrected for symbol errors before determining the CNR measurement by layered modulation processing which recovers the correct symbols for the signal by re-encoding the decoded symbols. The CNR measurement can be particularly employed in a layered modulation system as previously described; the phase-shift keyed signal comprises a layered modulation signal.

5.2 CNR Measurement at Timing Recovery Loop Output

In other embodiments, the CNR measurement can be determined at the timing recovery loop output. In this case, the signal is sampled at tracked symbol times ("top of the baud"). The amplitudes are stabilized and the carrier phase modulation remains. In processing the measurement there is no need to run a coherent carrier recovery loop. Thus, the impairment effect of carrier recovery loop is not included. Determining the CNR measurement at the timing recovery loop output should be more accurate than a measurement determined at the A/D output and before timing recovery loop (e.g. on the order of 0.2 dB at a CNR of approximately 7 dB). However, if the downstream carrier recovery loop shows poor performance, simulations show that the CNR measurement will be less accurate but still useful in many applications.

Figure 18A:
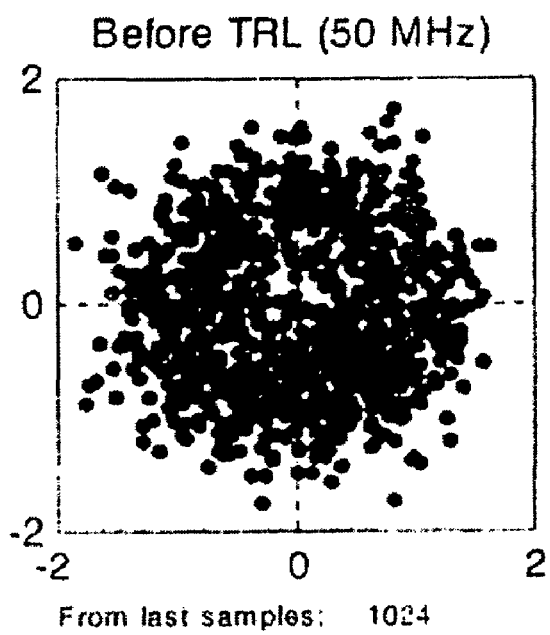
FIGS. 18A and 18B respectively illustrate a simulated received signal before and after the timing recovery loop.
Figure 18B:
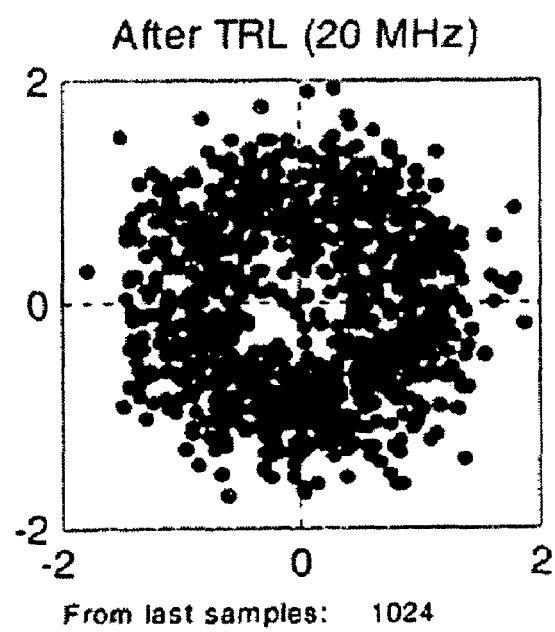

FIGS. 18A and 18B respectively illustrate a simulated received signal before and after the timing recovery loop. A linearized TWTA emulator for a transponder is used to produce the plots. In general, the CNR measurement is based on the thickness of the ring shown by the pattern of signal points in FIG. 18B. Symbol errors are irrelevant to the ring structure of the signal points.

Figure 19:
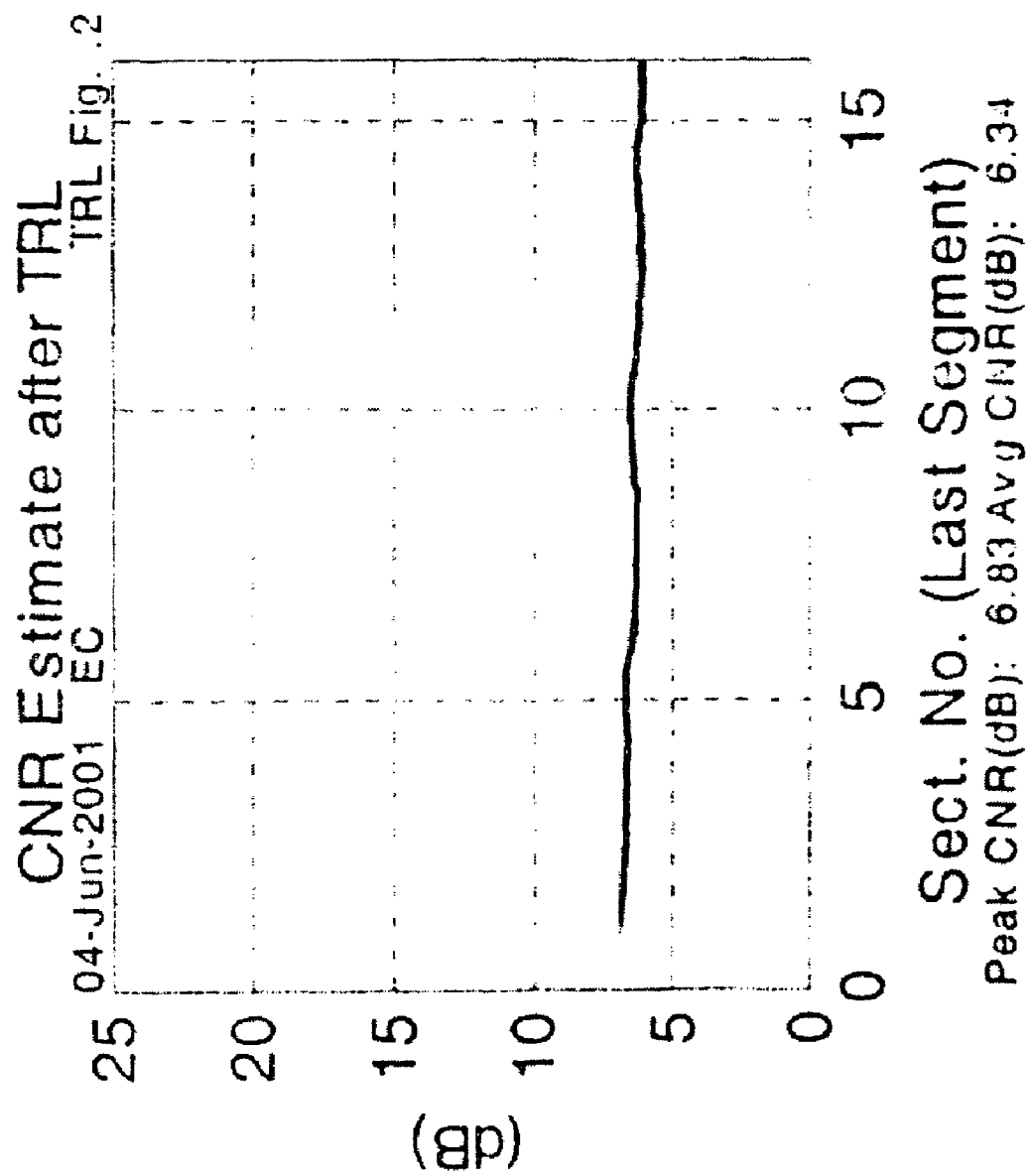
FIG. 19 illustrates the CNR measurement determined from the simulated signal shown in FIGS. 18A and 18B.

FIG. 19 illustrates the CNR measurement determined from the simulated signal shown in FIG. 18B. As shown in the figure, the measured CNR is approximately 6.3 dB. This compares reasonably with the input CNR of approximately 7 dB. Most of the degradation between the actual and measured CNR can be attributed to non-linearity of the TWTA.

Figure 20:
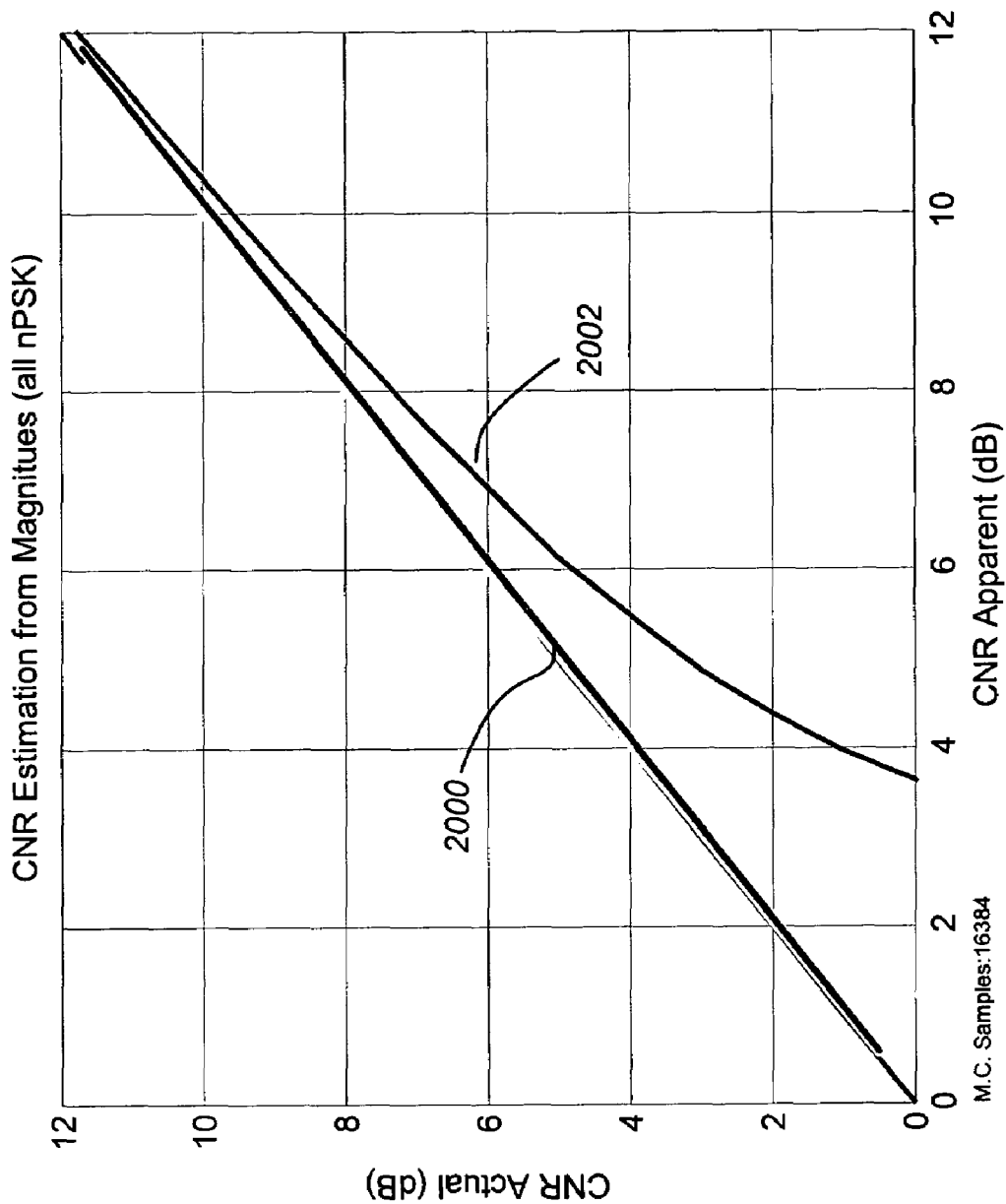
FIG. 20 illustrates the estimated CNR compared with the actual CNR at the output of the timing recovery loop.

FIG. 20 illustrates the actual CNR compared with the apparent (measured) CNR. Ideally, the actual CNR would be identical to the measured CNR as indicated by the straight line 2000. In reality, the measured CNR as determined from signal magnitudes follows Curve 2002 but may be calibrated with the curve. The CNR estimate obtained from magnitudes-only applies to all signal formats (nPSK). FIG. 20 shows that the CNR estimate line 2002 is biased from the actual CNR line 2002. However, the bias decreases with increasing CNR. In operation, this bias can be reduced or eliminated with an adjustment from a look-up table referencing only the signal magnitude.

Figure 21:
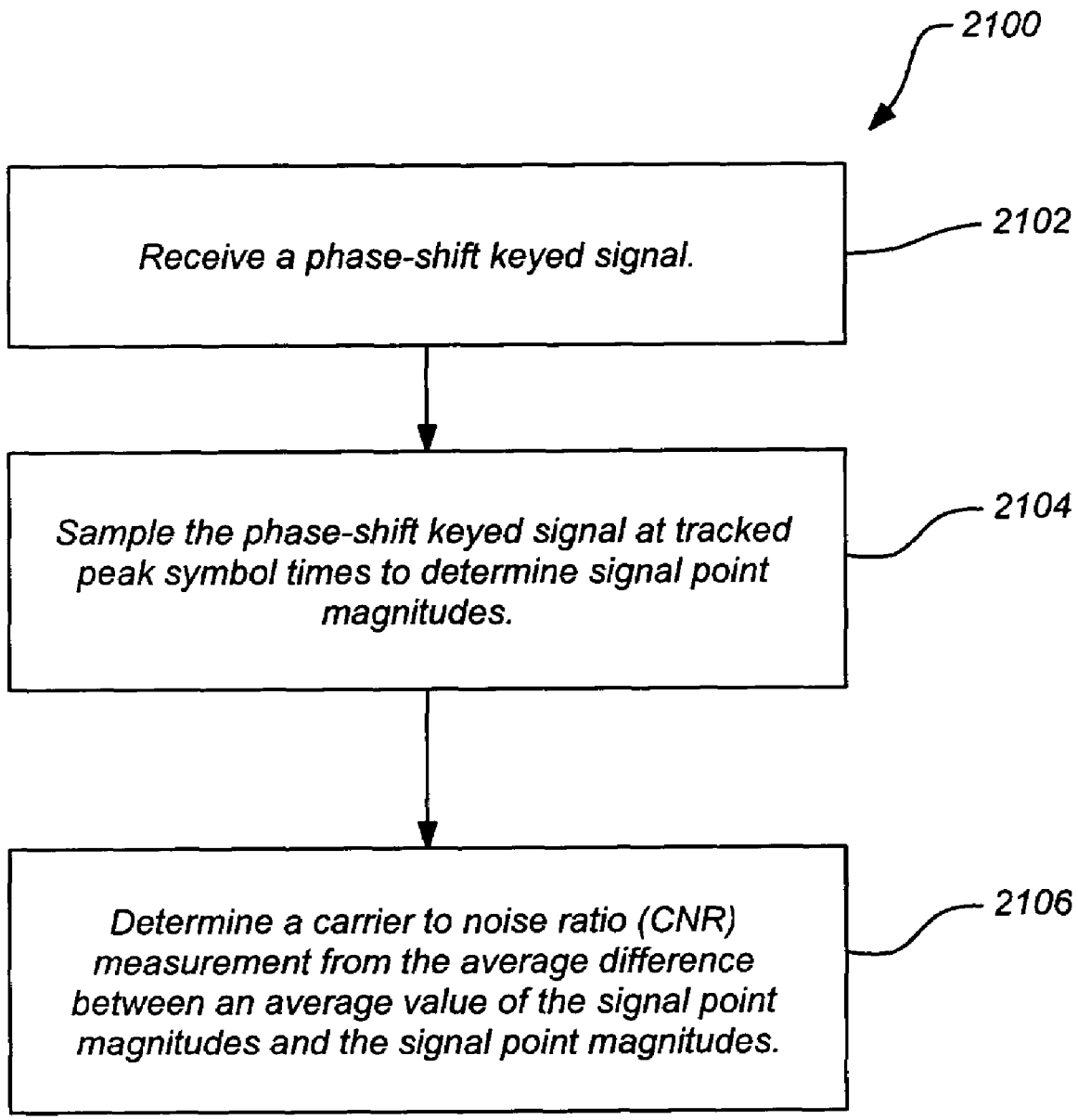
FIG. 21 is a flowchart of an exemplary method for measuring the CNR of a received signal at the output of the timing recovery loop.

FIG. 21 is a flowchart of an exemplary method for measuring the CNR of a received signal at an output of a timing recovery loop in the tuner/demodulator 904. In the exemplary method 2100, a phase-shift keyed signal is first received at step 2102. Next at step 2104, the phase-shift keyed signal is sampled at tracked peak symbol times to determine signal point magnitudes. Finally at step 2106, a CNR measurement is determined from the average difference between an average value of the signal point magnitudes and the signal point magnitudes. Bias of the CNR measurement can be reduced based upon a predicted systematic characteristic of the curve in FIG. 20. For example, a bias value from a look-up table based upon the CNR measurement can be subtracted from the CNR measurement. The CNR measurement can be particularly employed in a layered modulation system as previously described; the phase-shift keyed signal comprises a layered modulation signal.

5.3 CNR Measurement at A/D Output

In some embodiments, the CNR measurement can be determined at the A/D output where there is no need to demodulate the signal. The measurement is based on the A/D signal at base-band. In addition, processing of the CNR measurement at the A/D output is simplified. It can be performed as a byproduct of the PO4 fast acquisition for QPSK and is extendible to 8PSK and possibly 16QAM signals as well. PO4 processing raises the complex A/D samples to their fourth power. On a QPSK signal, this forms a DC component in the resulting signal. The CNR of the original signal can be measured by comparing the DC power with the rest of the signal power, i.e., the AC power. Likewise, PO8 processing raises the complex A/D samples to their eighth power which can be used to estimate the CNR of an 8PSK signal. However, accuracy of the measurement at the A/D output may be slightly reduced (e.g. on the order of 1 dB at a CNR of approximately 7 dB). However, this is adequate to provide a rough signal quality estimate in many applications. Estimating the CNR at the A/D output can help to optimizing processing parameter values to acquire carrier frequency and reach steady state tracking within the shortest time. In addition, the measurement can be applied to determine the timing and carrier recovery loop bandwidths for optimal performance.

Figure 22:
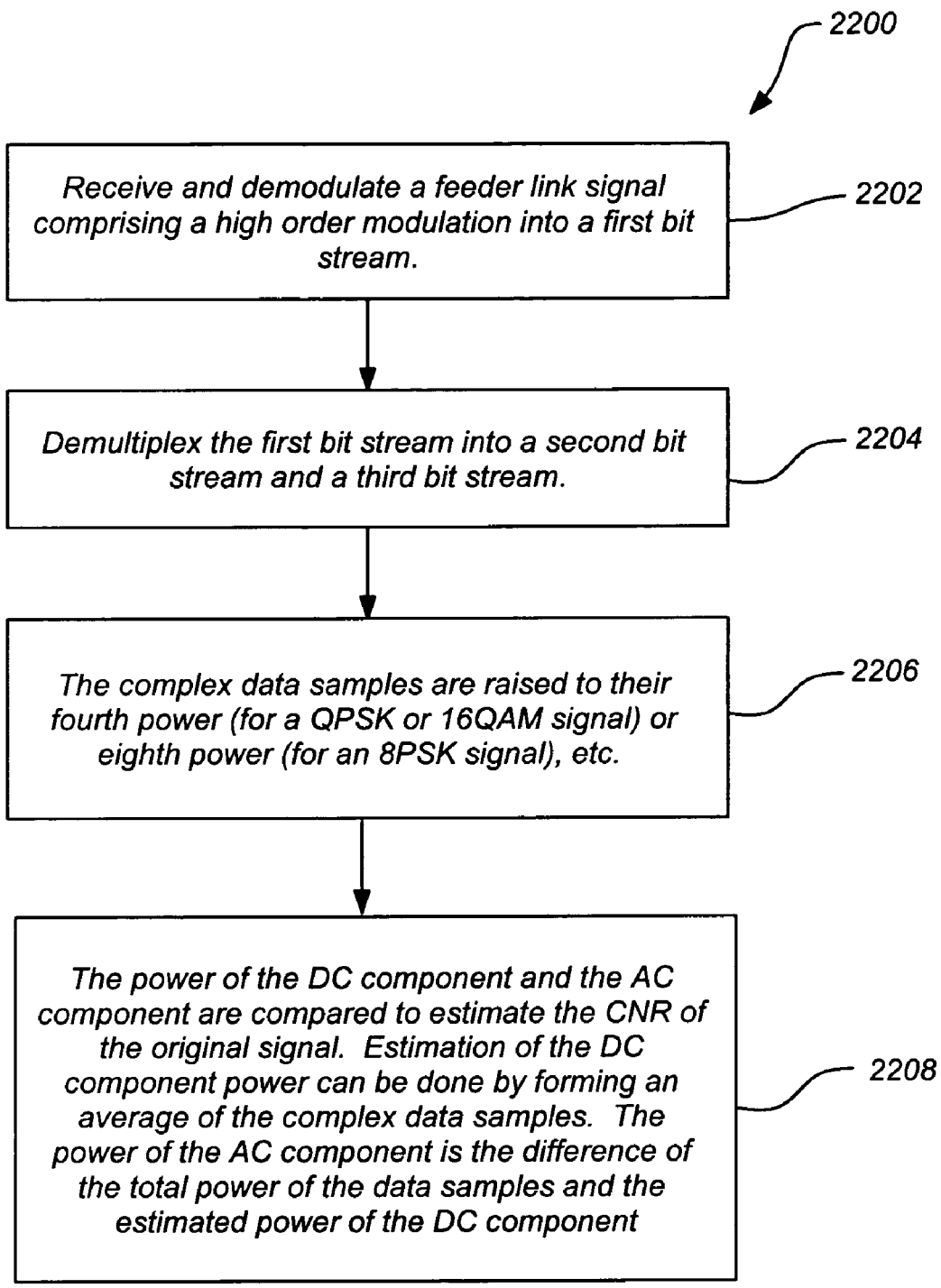
FIG. 22 is a flowchart of an exemplary method for measuring the CNR of a received signal at the output of the A/D converter.

FIG. 22 is a flowchart of an exemplary method for measuring the CNR of a received signal at an output of an A/D converter in the tuner/demodulator 904. In the exemplary method 2200 for measuring a carrier to noise ratio in a received signal, a phase-shift keyed signal is first received at step 2202. Next at step 2204, the phase-shift keyed signal is digitized at base-band to determine digitized signal values. At step 2206, the complex data samples are raised to their Nth power, e.g., the fourth power for a QPSK or 16QAM signal, or the eighth power for an 8PSK signal, etc. At step 2208, the power ration between the DC and AC components of the powered signal are compared to estimate the CNR of the original signal. Estimation of the DC component power can be done by forming an average of the complex data samples. The power of the AC component is the difference of the total power of the data samples and the estimated power of the DC component. The CNR measurement can be particularly employed in a layered modulation system as previously described; the phase-shift keyed signal comprises a layered modulation signal.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method comprising: receiving a phase-shift keyed signal with a layered modulation scheme having a first layer non-coherent with at least a second layer in the phase-shift keyed signal using a demodulator;

processing the phase-shift keyed signal through a carrier recovery loop to produce signal points in the second layer relative to ideal signal nodes located in the first layer; and determining a carrier to noise ratio (CNR) measurement from an average difference between the signal points and the respective ideal signal nodes.

2. The method of claim 1, further comprising reducing bias of the CNR measurement based upon a predicted system characteristic.

3. The method of claim 2, of reducing bias of the CNR measurement comprises the method step of determining a bias value from a look-up table based upon the CNR measurement and subtracting the bias value from the CNR measurement.

4. The method of claim 1, wherein the phase-shift keyed signal is corrected for symbol errors before determining the CNR measurement.

5. A method comprising: receiving a phase-shift keyed signal with a layered modulation scheme, wherein a first layer non-coherent with at least a second layer in the phase-shift keyed signal using a demodulator;

sampling the phase-shift keyed signal of the second layer at tracked peak symbol times to determine signal point magnitudes of the signal points in the second layer; and determining a carrier to noise ratio (CNR) measurement from the average difference between (a) an average value of the signal point magnitudes and (b) the signal point magnitudes.

6. The method of claim 5, of reducing bias of the CNR measurement based upon a predicted system characteristic.

7. The method of claim 6, of reducing bias of the CNR measurement comprises the method step of determining a bias value from a look-up table based upon the CNR measurement and subtracting the bias value from the CNR measurement.

8. The method of claim 5, wherein the phase-shift keyed signal is corrected for symbol errors before determining the CNR measurement.

9. A method comprising: receiving a phase-shift keyed signal with a layered modulation scheme, wherein a first layer non-coherent with at least a second layer in the phase-shift keyed signal using a demodulator;

digitizing the phase-shift keyed signal in the second layer at base-band to determine digitized signal values; and determining a carrier to noise ratio (CNR) measurement from the signal raised to its N-th power by comparing the power ratio between the DC and AC components of the powered signals.

10. The method of claim 9, wherein the phase-shift keyed signal comprises a QPSK signal and the CNR measurement is determined as part of a fast acquisition process.

11. The method of claim 9, wherein the N-th power comprises N=4 for QPSK signals.

12. The method of claim 9, wherein the N-th power comprises N=8 for 8PSK signals.

13. An apparatus for measuring a carrier to noise ratio in a received signal, comprising:

a demodulator for receiving a phase-shift keyed signal with a layered modulation scheme having a first layer non-coherent with at least a second layer in the phase-shift keyed signal, for processing the phase-shift keyed signal through a carrier recovery loop to produce signal points in the second layer relative to ideal signal nodes located in the first layer, and for determining a carrier to noise ratio (CNR) measurement from the average difference between an signal points and the respective ideal signal nodes.

14. The apparatus of claim 13, further comprising means for reducing bias of the CNR measurement based upon a predicted system characteristic.

15. The apparatus of claim 14, wherein the means for reducing bias of the CNR measurement comprises means for determining a bias value from a look-up table based upon the CNR measurement and subtracting the bias value from the CNR measurement.

16. The apparatus of claim 13, wherein the phase-shift keyed signal is corrected for symbol errors before determining the CNR measurement.

17. An apparatus for measuring a carrier to noise ratio in a received signal, comprising:
   a demodulator for receiving a phase-shift keyed signal with a layered modulation scheme having a first layer non-coherent with at least a second layer in the phase-shift keyed signal, for sampling the phase-shift keyed signal of the second layer at tracked peak symbol times to determine signal point magnitudes of the signal points in the second layer, and for determining a carrier to noise ratio (CNR) measurement from an average difference between (a) an average value of the signal point magnitudes and (b) the signal point magnitudes.

18. The apparatus of claim 17, further comprising means for reducing bias of the CNR measurement based upon a predicted system characteristic.

19. The apparatus of claim 18, wherein the means for reducing bias of the CNR measurement comprises means for determining a bias value from a look-up table based upon the CNR measurement and subtracting the bias value from the CNR measurement.

20. The apparatus of claim 17, wherein the phase-shift keyed signal is corrected for symbol errors before determining the CNR measurement.

21. An apparatus for measuring a carrier to noise ratio in a received signal, comprising:
   a demodulator for receiving a phase-shift keyed signal with a layered modulation scheme, wherein a first layer is non-coherent with at least a second layer of the phase-shift keyed signal, for digitizing the phase-shift keyed signal in the second layer at base-band to determine digitized signal values, and for determining a carrier to noise ratio (CNR) measurement from the signal raised to its N-th power by comparing the power ratio between the DC and AC components of the powered signals.

22. The apparatus of claim 21, wherein the phase-shift keyed signal comprises a QPSK signal and the CNR measurement is determined as part of a fast acquisition process.

23. The apparatus of claim 21, wherein the N-th power comprises N=4 for QPSK signals.

24. The apparatus of claim 21, wherein the N-th power comprises N=8 for 8PSK signals.

* * * * *